United States Patent
Chao et al.

(10) Patent No.: US 11,627,327 B2
(45) Date of Patent: Apr. 11, 2023

(54) PALETTE AND PREDICTION MODE SIGNALING

(71) Applicant: QUALCOMM Incorporated, San Diego, CA (US)

(72) Inventors: Yung-Hsuan Chao, San Diego, CA (US); Chao-Hsiung Hung, San Diego, CA (US); Wei-Jung Chien, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 89 days.

(21) Appl. No.: 16/947,463

(22) Filed: Aug. 3, 2020

(65) Prior Publication Data

US 2021/0044812 A1 Feb. 11, 2021

Related U.S. Application Data

(60) Provisional application No. 62/900,346, filed on Sep. 13, 2019, provisional application No. 62/887,450, (Continued)

(51) Int. Cl.
*H04N 19/186* (2014.01)
*H04N 19/593* (2014.01)
(Continued)

(52) U.S. Cl.
CPC ........... *H04N 19/186* (2014.11); *H04N 19/13* (2014.11); *H04N 19/176* (2014.11);
(Continued)

(58) Field of Classification Search
CPC ........ H04N 19/13; H04N 19/70; H04N 19/91; H04N 19/176
See application file for complete search history.

(56) References Cited

U.S. PATENT DOCUMENTS

2022/0030280 A1* 1/2022 Zhu .................. H04N 19/96

FOREIGN PATENT DOCUMENTS

WO WO-2020169103 A1 * 8/2020 ........... H04N 19/107
WO WO-2020243295 A1 * 12/2020 ........... H04N 19/119
(Continued)

OTHER PUBLICATIONS

"Improvements of HEVC SCC Palette Mode and Intra Block Copy"—Yu-Chen Sun et al.; IEEE Journal on Emerging and Selected Topics in Circuits and Systems, vol. 6, No. 4, Dec. 2016 (Year: 2016).*

(Continued)

*Primary Examiner* — Mainul Hasan
(74) *Attorney, Agent, or Firm* — Shumaker & Sieffert, P.A.

(57) ABSTRACT

An example device for decoding video data includes a memory for storing the video data and one or more processors implemented in circuitry and communicatively coupled to the memory. The one or more processors are configured to determine whether a first coding unit (CU) is a skip mode CU, and based on the first CU not being a skip mode CU, determine whether the first CU is encoded using one of an intra mode or a palette mode. The one or more processors are also configured to determine whether the first CU is encoded using the palette mode based on the first CU being encoded using one of the intra mode or the palette mode. The one or more processors are also configured to decode the first CU based on the determination of whether the first CU is encoded using the palette mode.

40 Claims, 25 Drawing Sheets

Related U.S. Application Data filed on Aug. 15, 2019, provisional application No. 62/883,024, filed on Aug. 5, 2019.

(51) Int. Cl.
*H04N 19/70* (2014.01)
*H04N 19/176* (2014.01)
*H04N 19/13* (2014.01)
*H04N 19/91* (2014.01)

(52) U.S. Cl.
CPC ........... *H04N 19/593* (2014.11); *H04N 19/70* (2014.11); *H04N 19/91* (2014.11)

(56) References Cited

FOREIGN PATENT DOCUMENTS

| | | | | |
|---|---|---|---|---|
| WO | WO-2021013120 A1 * | 1/2021 | ............. | H04N 19/11 |
| WO | WO-2021018167 A1 * | 2/2021 | ........... | H04N 19/105 |

OTHER PUBLICATIONS

"High performance hardware architectures for Intra Block Copy and Palette Coding for HEVC Screen Content Coding extension"—Rishan Senanayake et al.; 2017 IEEE 28th International Conference on Application-specific Systems, Architectures and Processors (ASAP) (Year: 2017).*

"Palette Mode Coding in HEVC Screen Content Coding Extension"—Wei Pu et al.; IEEE Journal on Emerging and Selected Topics in Circuits and Systems, vol. 6, No. 4, Dec. 2016 (Year: 2016).*

"Palette-based Coding in the Screen Content Coding Extension of the HEVC Standard"—Xiaoyu Xiu et al.; 2015 Data Compression Conference (Year: 2015).*

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip_JVET-O2001-v8.docx [retrieved on Jul. 15, 2019], abstract section 7.3.8.5.

Bross B., et al., "Versatile Video Coding (Draft 8)", Joint Video Experts Team (JVET) of ITU-T SG 16 WP 3 and ISO/IEC JTC 1/SC 29/WG 11,17th Meeting: Brussels, BE, Jan. 7-17, 2020, Document: JVET-Q2001-vA, 519 Pages.

Bross B., et al., "Versatile Video Coding (Draft 9)", JVET-R2001-vA, Joint Video Experts Team (JVET) of ITU-T SG 16 WP 3 and ISO/IEC JTC 1/SC 29/WG 11, 18th Meeting, by Teleconference, Apr. 15-24, 2020, 528 Pages.

Chao Y-H., et al., "CE8-2.1: Palette Mode in HEVC", JVET-O0119, 15th JVET Meeting, Jul. 3, 2019-Jul. 12, 2019, Gothenburg, (The Joint Video Exploration Team of ISO/IEC JTC1/SC29/WG11 and ITU-TSG.16 WP 3), No. JVET-O0119, Jul. 9, 2019 (Jul. 9, 2019), XP030218670, 7 Pages, Retrieved from the Internet: URL: http://phenix.int-evry.fr/jvet/doc_end_user/documents/15_Gothenburg/wg11/JVET-O0119-v3.zip JVET-O0119-v3/JVET-O0119-WD-v2.docx, JVET-O0119-V3, [retrieved on Jul. 9, 2019].

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

International Search Report and Written Opinion—PCT/US2020/044817—ISA/EPO—dated Oct. 22, 2020.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Zhu (Bytedance) W., et al., "CE8-Related: Palette Mode Coding", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N0258, Mar. 13, 2019 (Mar. 13, 2019), pp. 1-6, XP030254769, Retrieved from the Internet: URL: http://phenix.int-evry.fr/jvet/doc_end_user/documents/14_Geneva/wg11/JVET-N0258-v1.zip JVET-N0258.docx [retrieved on Mar. 13, 2019], Section 3.

JVET: "VTM-6.0, Tags, JVET/VVCSoftware_VTM, GitLab", Frank Bossen, https://vcgit.hhi.fraunhofer.de/jvet/VVCSoftware_VTM/-/tags/VTM-6.0, Jul. 2019, pp. 1-4.

Xu X., et al., "Description of Core Experiment 8 (CE8): 4:4:4 Screen Content Coding Tools", JVET-O2028-v1, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-7.

Chao, Yung-Hsuan, et al., "Non-CE8: Palette mode and prediction mode signaling" JVET-P0476, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-7.

International Preliminary Report on Patentability from International Application No. PCT/US2020/044817, dated Feb. 17, 2022, 8 pp.

* cited by examiner

PALETTE AND PREDICTION MODE SIGNALING

This non-provisional application claims priority to U.S. Provisional Application No. 62/883,024, filed Aug. 5, 2019, U.S. Provisional Application No. 62/887,450, filed Aug. 15, 2019, and U.S. Provisional Application No. 62/900,346, filed Sep. 13, 2019, the entire contents of each of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques relating to prediction mode and screen content mode coding. For example, this disclosure describes techniques for palette and prediction mode signaling.

The techniques described herein may be applied to existing video codecs, such as HEVC (High Efficiency Video Coding) or VVC (Versatile Video Coding), or may be applied to coding tools in future video standards.

In one example, a method of coding video data includes determining whether intra block copy mode is enabled for a first coding unit (CU); based on intra block copy mode not being enabled for the first CU, determining whether the first CU is a skip mode CU; based on the first CU not being a skip mode CU, determining whether the first CU is encoded using one of an intra mode or a palette mode; based on the first CU being encoded using one of the intra mode or the palette mode, determining whether the first CU is encoded using the palette mode; decoding the first CU based on the determination of whether the first CU is encoded using the palette mode; determining whether intra block copy mode is enabled for a second CU; based on intra block copy mode not being enabled for the second CU, determining whether the second CU is a skip mode CU; and based on the second CU being a skip mode CU, not parsing a bin indicative of whether the second CU is encoded using intra block copy mode and decoding the second CU using inter mode.

In another example, a device for coding video data includes a memory for storing the video data and one or more processors implemented in circuitry and communicatively coupled to the memory, the one or more processors being configured to: determine whether intra block copy mode is enabled for a first coding unit (CU); based on intra block copy mode not being enabled for the first CU, determine whether the first CU is a skip mode CU; based on the first CU not being a skip mode CU, determine whether the first CU is encoded using one of an intra mode or a palette mode; based on the first CU being encoded using one of the intra mode or the palette mode, determine whether the first CU is encoded using the palette mode; decode the first CU based on the determination of whether the first CU is encoded using the palette mode; determine whether a second CU is a skip mode CU; and based on the second CU being a skip mode CU, not parse a bin indicative of whether the second CU is encoded using intra block copy mode and decode the second CU using inter mode.

In another example, a non-transitory computer-readable storage medium having stored thereon instructions that, when executed, cause one or more processors to: determine whether intra block copy mode is enabled for a first coding unit (CU); based on intra block copy mode not being enabled for the first CU, determine whether the first CU is a skip mode CU; based on the first CU not being a skip mode CU, determine whether the first CU is encoded using one of an intra mode or a palette mode; based on the first CU being encoded using one of the intra mode or the palette mode, determine whether the first CU is encoded using the palette mode; decode the first CU based on the determination of whether the first CU is encoded using the palette mode; determine whether intra block copy mode is enabled for a second CU; based on intra block copy mode not being enabled for the second CU, determine whether the second CU is a skip mode CU; and based on the second CU being a skip mode CU, not parse a bin indicative of whether the second CU is encoded using intra block copy mode and decode the second CU using inter mode.

In another example, a device for coding video data includes means for determining whether intra block copy mode is enabled for a first coding unit (CU), means for determining whether the first CU is a skip mode CU based on intra block copy mode not being enabled for the first CU, means for determining whether the first CU is encoded using one of an intra mode or a palette mode based on the first CU not being a skip mode CU, means for determining whether the first CU is a skip mode CU, means for determining whether the first CU is encoded using one of an intra mode or a palette mode based on the first CU not being a skip mode CU, means for determining whether the first CU is encoded using the palette mode based on the first CU being encoded using one of the intra mode or the palette mode, means for decoding the first CU based on the determination of whether the first CU is encoded using the palette mode, means for determining whether intra block copy mode is enabled for a second CU, means for determining whether a second CU is a skip mode CU based on intra block copy mode not being enabled for the second CU, and means for not parsing a bin indicative of whether the second CU is encoded using intra block copy mode based on the second CU being a skip mode CU, and means for decoding the second CU using inter mode.

The details of one or more examples are set forth in the accompanying drawings and the description below. Other features, objects, and advantages will be apparent from the description, drawings, and claims.

DETAILED DESCRIPTION

Some video coders may make many different checks while determining signaling and parsing of syntax elements. For example, many conditions may exist that may enable or disable various encoding modes. In determining signaling of syntax elements, a video coder may have to determine whether a slice is an I slice or a P or B slice and determine which modes are enabled in order to determine which signaling path to follow. For example, in some codecs whether to signal the palette flag for a current CU that is encoded using intra mode or a current CU that is encoded using another mode (e.g., inter) depends on whether the IBC mode is enabled in the SPS signaling or not. This non-unified design may complicate the syntax and design of the parsing process by the video decoder, thereby causing inefficiencies that may degrade coding performance.

According to the techniques of this disclosure, a video coder may determine signaling in a more consistent manner. As such, fewer conditions may need to be checked by the video coder, for example the video decoder. Thus, the techniques of this disclosure may result in the video coder using less processing power and may reduce decoding latency.

Figure 1:
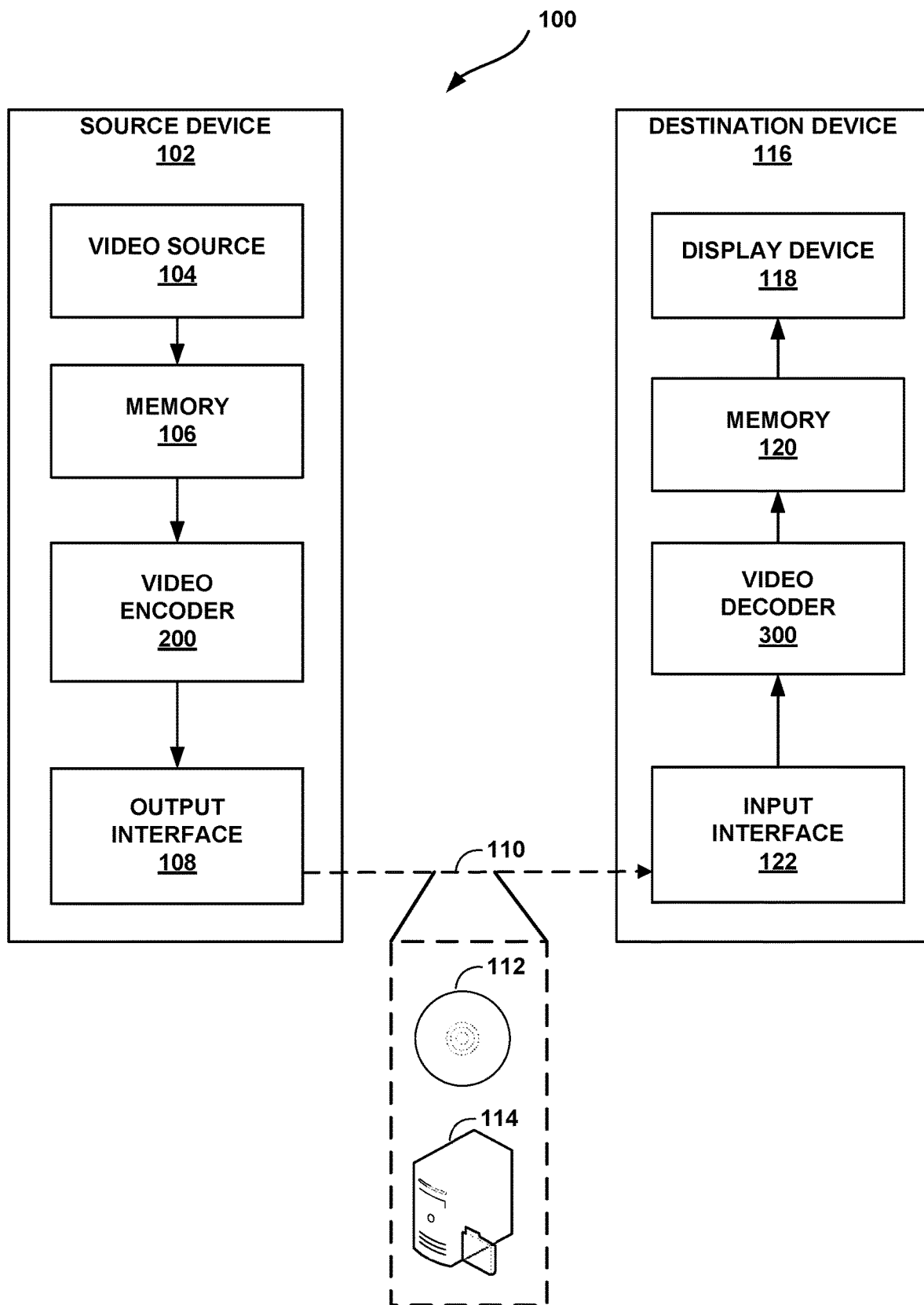
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding video data including the palette and prediction mode signaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for palette and prediction mode signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). For example, the example signaling schemes according to the techniques of this disclosure may be used by video encoder 200 to signal to video decoder 300 how to decode a current block of video data. Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-02001-vE (hereinafter "VVC Draft 6"). The techniques of this disclosure, however, are not limited to any particular coding standard. A more recent draft of the VVC standard is described in described in Bross, et al. "Versatile Video Coding (Draft 9)," Joint Video Experts Team (JVET) of ITU-T SG 16 WP 3 and ISO/IEC JTC 1/SC 29/WG 11, 18th Meeting: by teleconference, 15-24 Apr. 2020, JVET-R2001-vA.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method of coding video data includes determining whether intra block copy mode is enabled for a first coding unit (CU); based on intra block copy mode not being enabled for the first CU, determining whether the first coding unit CU is a skip mode CU; based on the first CU not being a skip mode CU, determining whether the first CU is encoded using one of an intra mode or a palette mode; based on the first CU being encoded using one of the intra mode or the palette mode, determining whether the first CU is encoded using the palette mode; decoding the first CU based on the determination of whether the first CU is encoded using the palette mode; determining whether intra block copy mode is enabled for a second CU; based on intra block copy mode not being enabled for the second CU, determining whether the second CU is a skip mode CU; and based on the second CU being a skip mode CU, not parsing a bin indicative of whether the second CU is encoded using intra block copy mode and decoding the second CU using inter mode.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
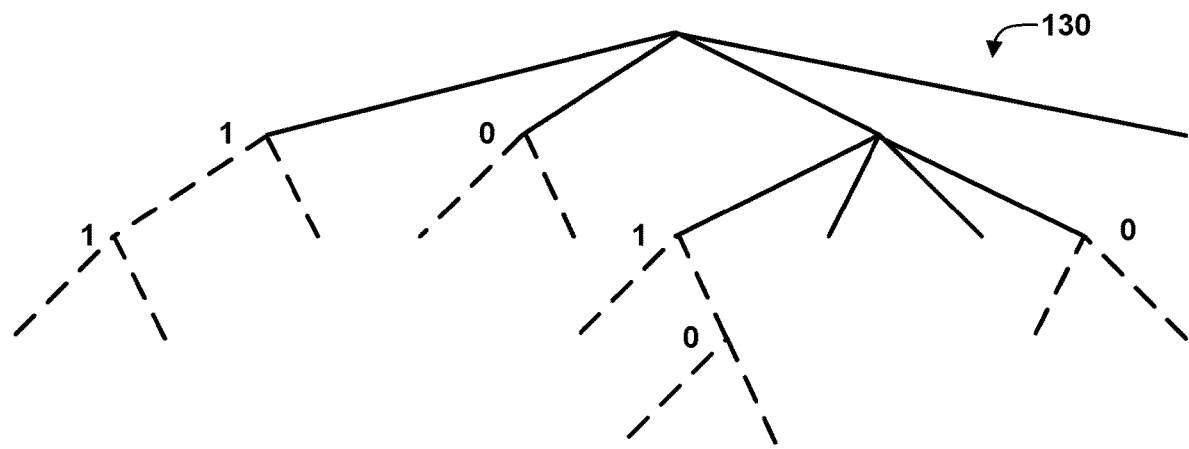
FIGS. 2A and 2B are conceptual diagrams illustrating an example quadtree binary tree (QTBT) structure, and a corresponding coding tree unit (CTU).
Figure 2B:
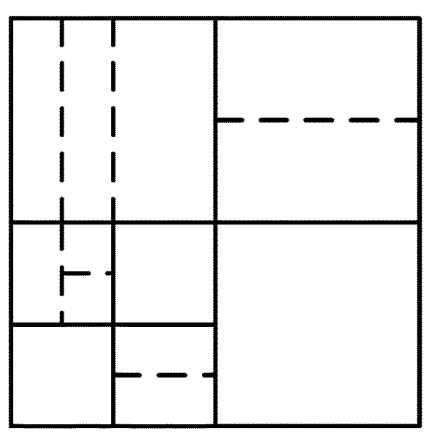

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
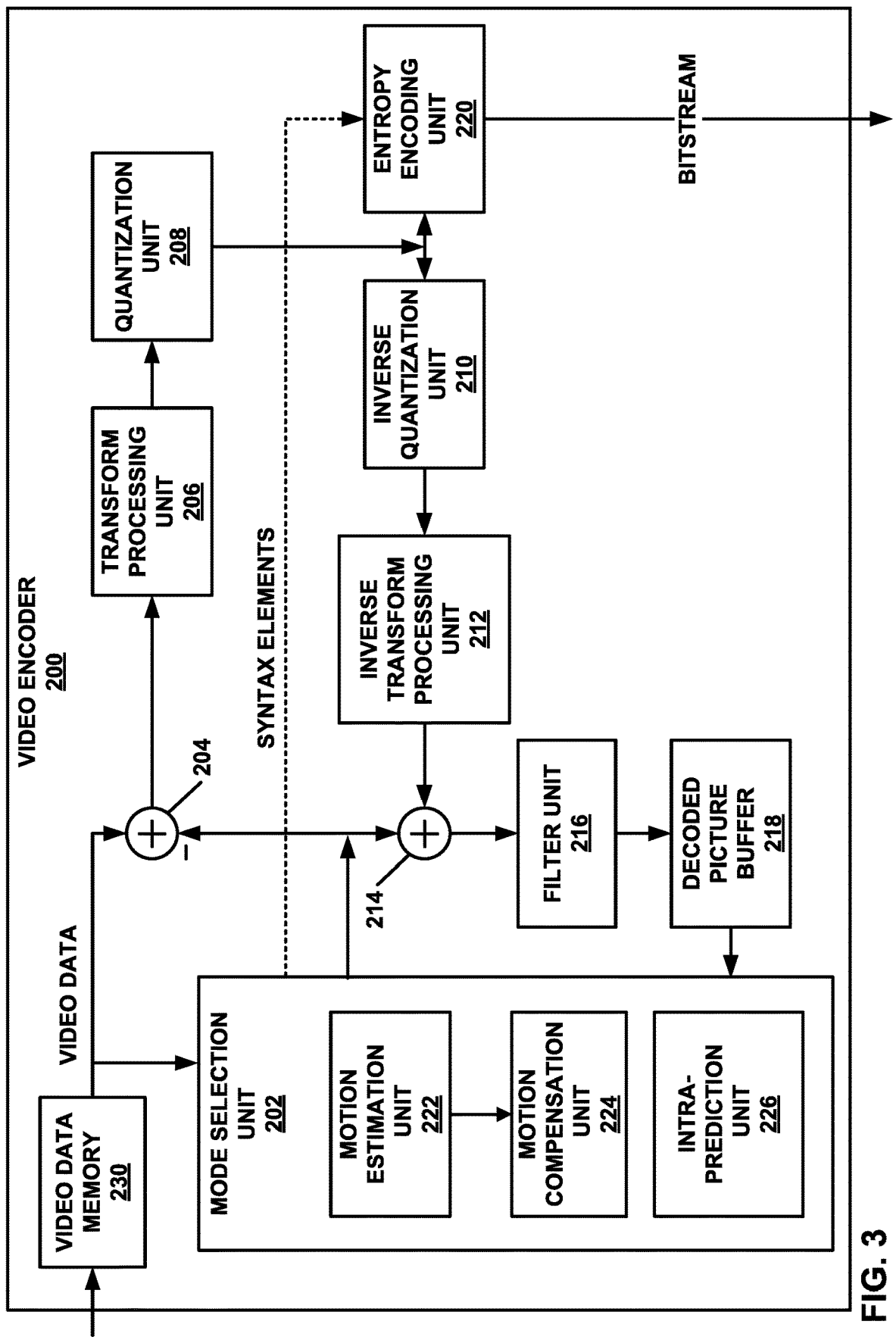
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded. In some examples, mode selection unit 202 may generate syntax elements according to the example signaling techniques of this disclosure.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to signal whether a first CU is a skip mode CU; based on the first CU not being a skip mode CU, signal whether the first CU is encoded using one of an intra mode or a palette mode; based on the first CU being encoded using one of the intra mode or the palette mode, signal whether the first CU is encoded using the palette mode; signal whether a second CU is a skip mode CU; and based on the second CU being a skip mode CU, not signal a bin indicative of whether the second CU is encoded using intra block copy.

Figure 4:
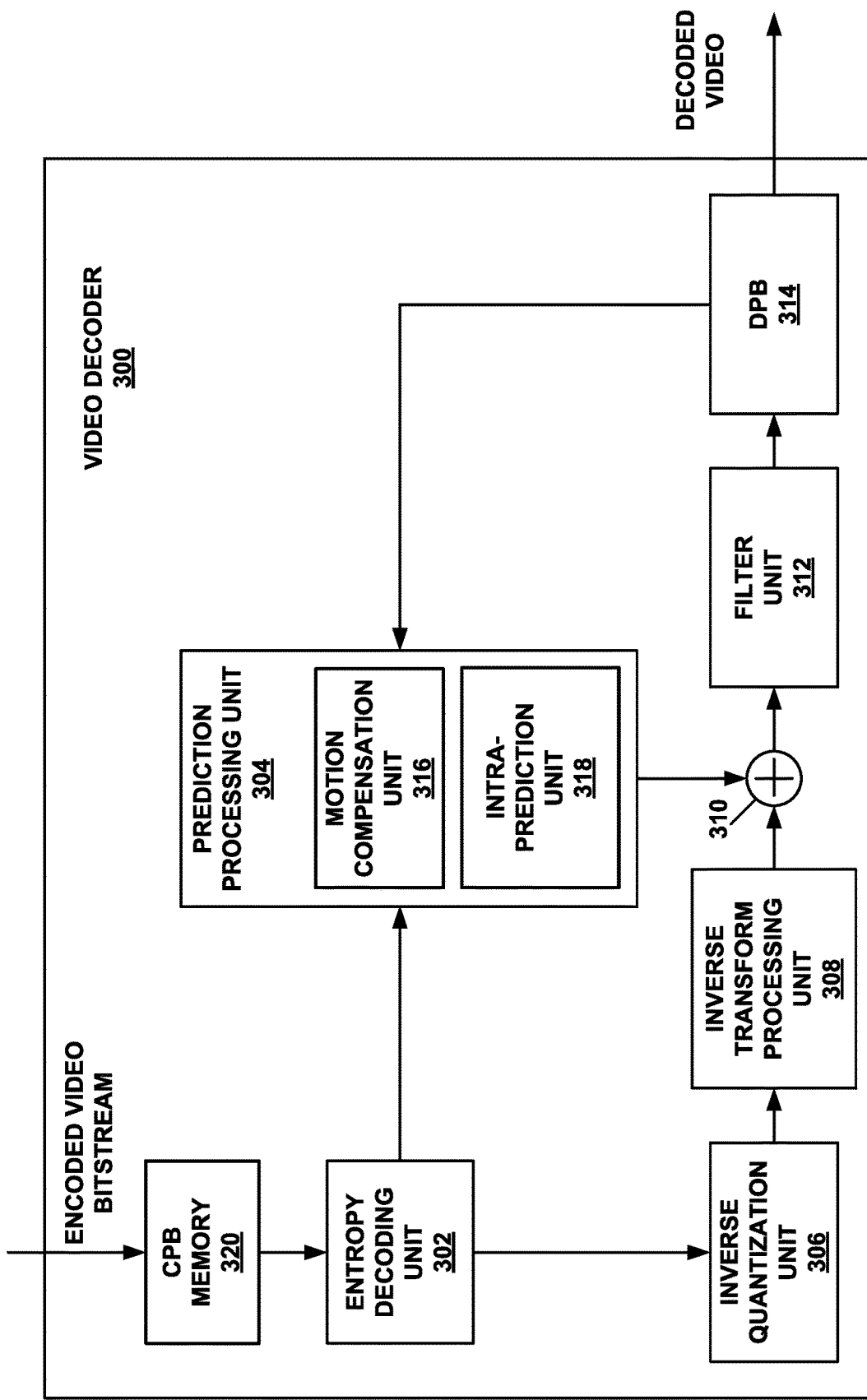
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements which may be signaled by video encoder 200 according to the techniques of this disclosure) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. Prediction processing unit 304 may utilize the techniques of this disclosure to determine what mode(s) was used to encode a given block. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to: determine whether intra block copy mode is enabled for a first coding unit (CU); based on intra block copy mode not being enabled for the first CU, determine whether the first CU is a skip mode CU; based on the first CU not being a skip mode CU, determine whether the first CU is encoded using one of an intra mode or a palette mode; based on the first CU being encoded using one of the intra mode or the palette mode, determine whether the first CU is encoded using the palette mode; decode the first CU based on the determination of whether the first CU is encoded using the palette mode; determine whether intra block copy mode is enabled for a second CU; based on intra block copy mode not being enabled for the second CU, determine whether the second CU is a skip mode CU; and based on the second CU being a skip mode CU, not parse a bin indicative of whether the second CU is encoded using intra block copy mode and decode the second CU using inter mode.

FIGS. 5-23 depict a number of palette and prediction mode signaling techniques. Signaling schemes provide a way for a video encoder, such as video encoder 200, to pass information to a video decoder, such as video decoder 300, about how the video encoder encoded the video data. In the examples of FIGS. 5-23, the signaling schemes presented provide a way for a video decoder to determine whether a current CU is a skip mode CU and which mode should be used to decode the current CU. In these FIGS., the YESes and NOs indicates if the corresponding condition is TRUE (e.g., the bin is a 1) or FALSE (e.g., the bin is a 0), respectively. MODE_PLT indicates palette mode, MODE_IBC indicates intra block copy mode, MODE_INTRA indicates regular intra prediction mode, and MODE_INTER indicates regular inter prediction mode.

Figure 5:
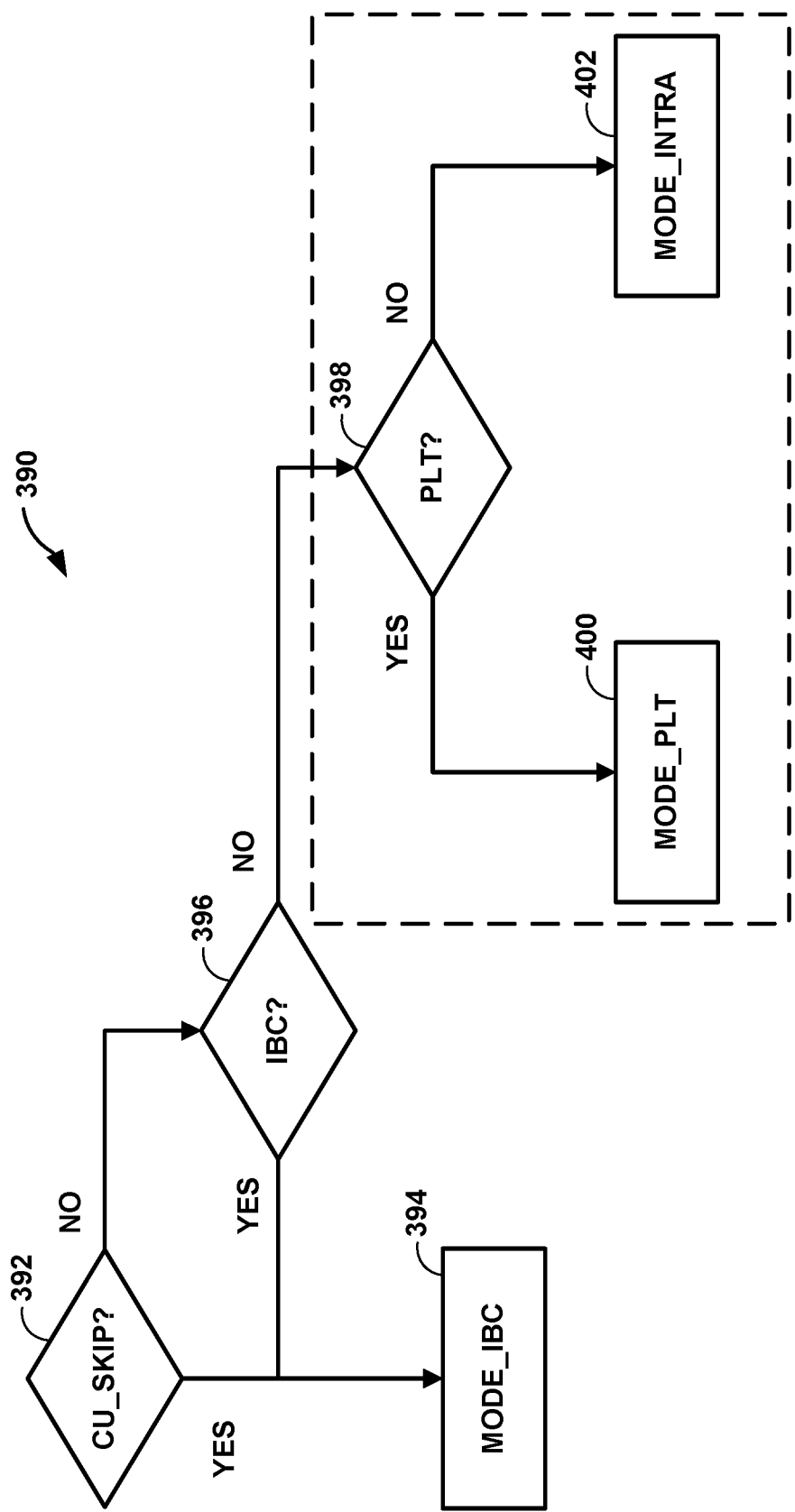
FIGS. 5-7 are diagrams illustrating a non-unified palette and prediction signaling method.
Figure 6:
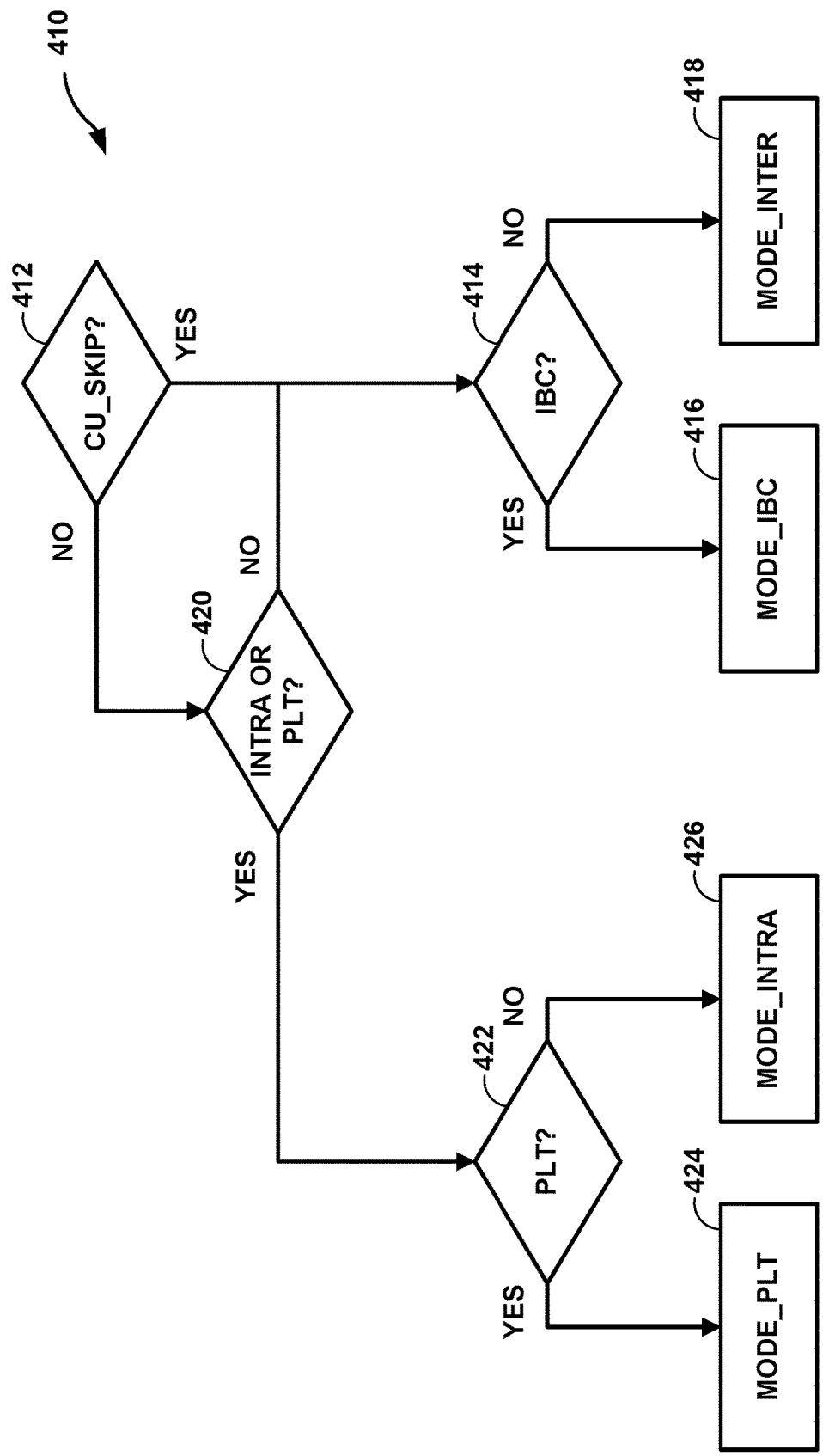
Figure 7:
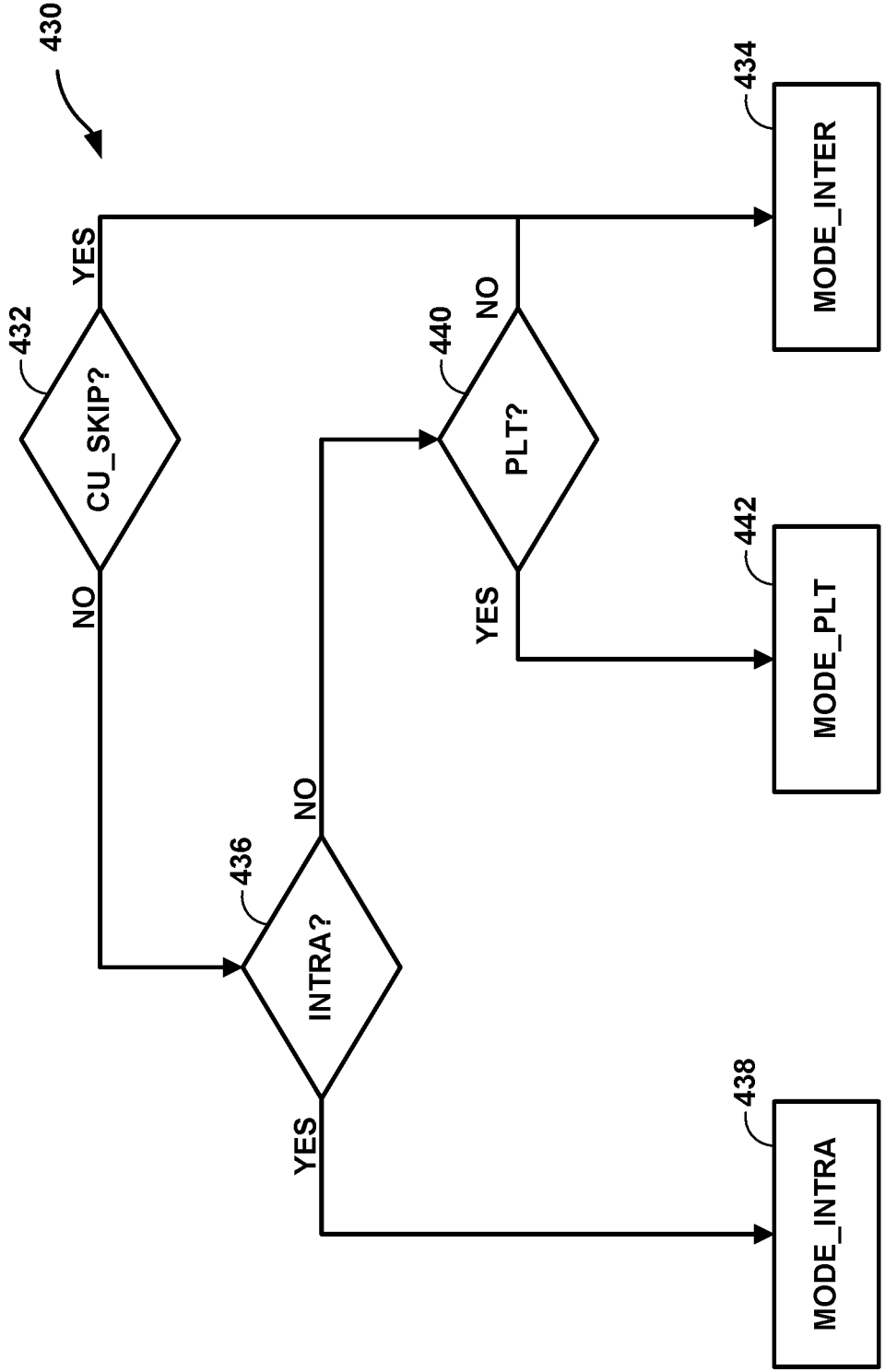

FIGS. 5-7 are diagrams illustrating a non-unified palette and prediction signaling method. In the JVET meeting in Geneva, March 2019, a method of palette mode signaling was proposed in W. Zhu, L. Zhang, J. Xu, K. Zhang, H. Liu, Y. Wang, "CE8-related: Palette Mode Coding", JVET-N0258, 2019 (hereinafter "JVET-N0258"), and adopted into the base palette mode of VVC Draft 6. FIG. 5 shows the CU signaling flow chart 390 in an I slice as was proposed in JVET-N0258. When MODE_IBC is enabled in the SPS signaling, the first bin is signaled with a syntax element, e.g., cu_skip_flag, to indicate if the current CU is a skip mode CU (392). If the current CU is a skip mode CU (the "YES" path from block 392), the current CU is encoded using MODE_IBC (394). Otherwise (the "NO" path from block 392), a second bin is signaled with a syntax element, e.g., pred_mode_ibc_flag, to indicate whether the current CU is encoded using MODE_IBC (396). For example, the second bin may correspond to the syntax If the first bin is a 0, and the second bin is a 1 (the "YES" path from block 396), the current CU is encoded using MODE_IBC (396). If the current CU is not encoded using MODE_IBC (the "NO" path from block 396), a third bin is then signaled with a syntax element, e.g., pred_mode_plt_flag, to indicate whether the current CU is encoded using MODE_PLT (398). If the third bin is 1 (the "YES" path from block 398), the current CU is encoded using MODE_PLT (400). If the third bin is 0 (the "NO" path from block 398), the current CU is not encoded using MODE_PLT and is encoded using MODE_INTRA (402). If inter block copy mode is disabled, only one bin is signaled with a syntax element, e.g., pred_mode_plt_flag, to indicate whether the current CU is encoded using MODE_PLT or not (in which case the current CU is encoded using MODE_INTRA), as shown in the dashed line block in FIG. 5.

FIG. 6 shows CU signaling flow chart 410 in a P or B tile/slice when IBC prediction mode is enabled in the SPS signaling as proposed in JVET-N0258. As can be seen, the example signaling scheme of FIG. 5 differs from the example signaling scheme of FIG. 6. Therefore, the signaling scheme in JVET-N0258 is different for I tiles/slices than the signaling scheme is for P or B tiles/slices and a video decoder, such as video decoder 300 may need to determine whether the current CU is in an I tile/slice or a P or B tile/slice to be able to parse the signaling accurately. In the example of FIG. 6, the flag for CU_SKIP mode will be signaled first (412). If the current CU is a skip mode CU (the "YES" path from block 412), the second bin is signaled to indicate whether the current CU is encoded using MODE_IBC or not (414).

If the first bin is 1 and the second bin is 1 (the "YES" path from block 414), the current CU is encoded using MODE_IBC (416). If the first bin is 1 and the second bin is 0 (the "NO" path from block 414), the current CU is encoded using MODE_INTER, regular inter prediction mode (416). If current CU is not a skip mode CU (the "NO" path from block 412), the second bin is signaled to indicate whether the current CU is encoded using intra mode or palette mode (420). If the condition is TRUE (e.g., the current CU is encoded using either intra mode or palette mode) (the "YES" path from block 420), a third bin is signaled to indicate the current CU is encoded using MODE_PLT or not (422).

If the first bin is 0, the second bin is 1, and the third bin is 1 (the "YES" path from block 422), the current CU is encoded using MODE_PLT (424). If the first bin is 0, the second bin is 1, and the third bin is 0 (the "NO" path from block 422), the current CU is encoding using MODE_INTRA (426). If the first bin is 0 and the second bin is 0 (the "NO" path from block 420), a third bin is signaled to indicate the current CU is encoded using MODE_IBC or not (414). If the first bin is 0, the second bin is 0, and the third bin is 1 (the "YES" path from block 414), the current CU is encoded using MODE_IBC (416). If the first bin is 0, the second bin is 0, and the third bin is 0 (the "NO" path from block 414), the current CU is encoded using MODE_INTER (418).

FIG. 7 shows CU signaling flow chart 430 in P/B tiles/slice when IBC prediction mode is disabled in SPS signaling as proposed in JVET-N0258. CU_SKIP will be signaled first (432). If the current CU is a skip mode CU (the "YES" path from block 432), the current CU is encoded using MODE_INTER (434). Otherwise (the "NO" path from block 432), a second bin is signaled to indicate whether the current CU is encoded using intra mode or not intra mode (436). If the first bin is 0 and the second bin is 1 (the "YES" path from block 436), the current CU is encoded using MODE_INTRA (438). If first bin is 0 and the second bin is 0 (the "NO" path from block 436), a third bin is signaled to indicate whether the current CU is encoded using MODE_PLT or not (440). If the first bin is 0, the second bin is 0, and the third bin is 1 (the "YES" path from block 440), the current CU is encoded using MODE_PLT (442). If the first bin is 0, the second bin is 0, and the third bin is 0 (the "NO" path from block 440), the current CU is encoded using MODE_INTER (434).

Figure 8:
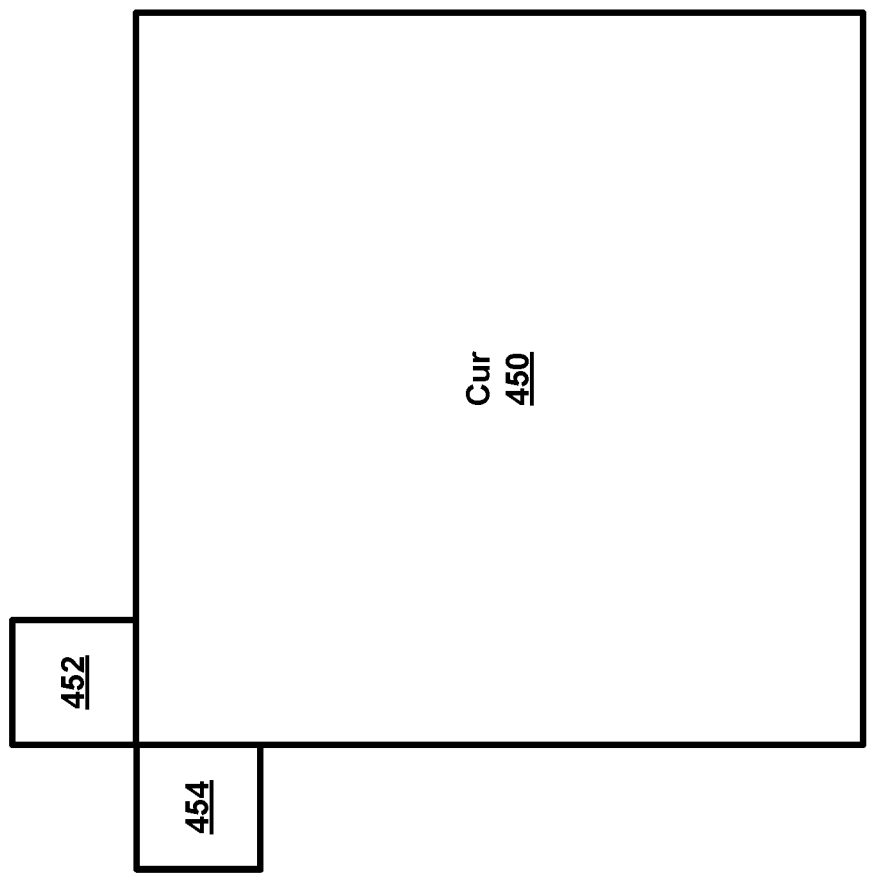
FIG. 8 is a conceptual diagram illustrating neighboring CUs.

The flag indicating whether the prediction mode of the current CU is MODE_INTRA or MODE_PLT in FIG. 6 and the flag indicating whether the prediction mode for the current CU mode is MODE_INTRA in FIG. 7 is context coded. FIG. 8 is a conceptual diagram illustrating neighboring CUs. The context modeling is based on the prediction mode of the CU above (cuAbove) 452 the current block and the prediction mode of the CU on the left (cuLeft) 454 of the current block 450. The context index (ctxIdx) is determined as follows:

ctxIdx=1 if cuAbove is MODE_INTRA or cuLeft is MODE_INTRA ctxIdx=0 otherwise

In the method described by JVET-N0258, whether to signal the palette flag for a CU of intra mode or a CU not of intra mode (e.g., of inter mode) depends on whether the intra block copy mode is enabled in the SPS signaling or not. For example, in the examples of FIG. 5 and FIG. 6, a palette flag may indicate whether a current CU is encoded using palette mode or intra mode. However, in the example of FIG. 7, an intra flag may indicate whether the current CU is encoded using intra mode. If this intra flag indicates that the current CU is not encoded using intra mode, another flag is signaled to indicate whether the current CU is encoded using palette mode or inter mode. The example of FIG. 5 differs from the example of FIG. 6 based on whether the current CU is in an I tile/slice or whether the current CU is in a P or B tile/slice.

The example of FIG. 7 differs from the examples of FIGS. 5 and 6 based on whether IBC mode is enabled or disabled. So to accurately parse signaling under the signaling schemes in JVET-N0258, a video decoder, such as video decoder 300, may have to determine whether the current CU is in an I tile/slice or in a P or B tile/slice, or the video decoder, such as video decoder 300, may have to determine whether IBC mode is enabled or disabled. This non-unified signaling scheme may complicate the syntax and design of the parsing process, thereby causing inefficiencies that may degrade coding performance. Several example simplification and unification of palette mode signaling schemes are disclosed below which may improve coding efficiency, reduce processing power consumption, and reduce decoding latency.

Figure 9:
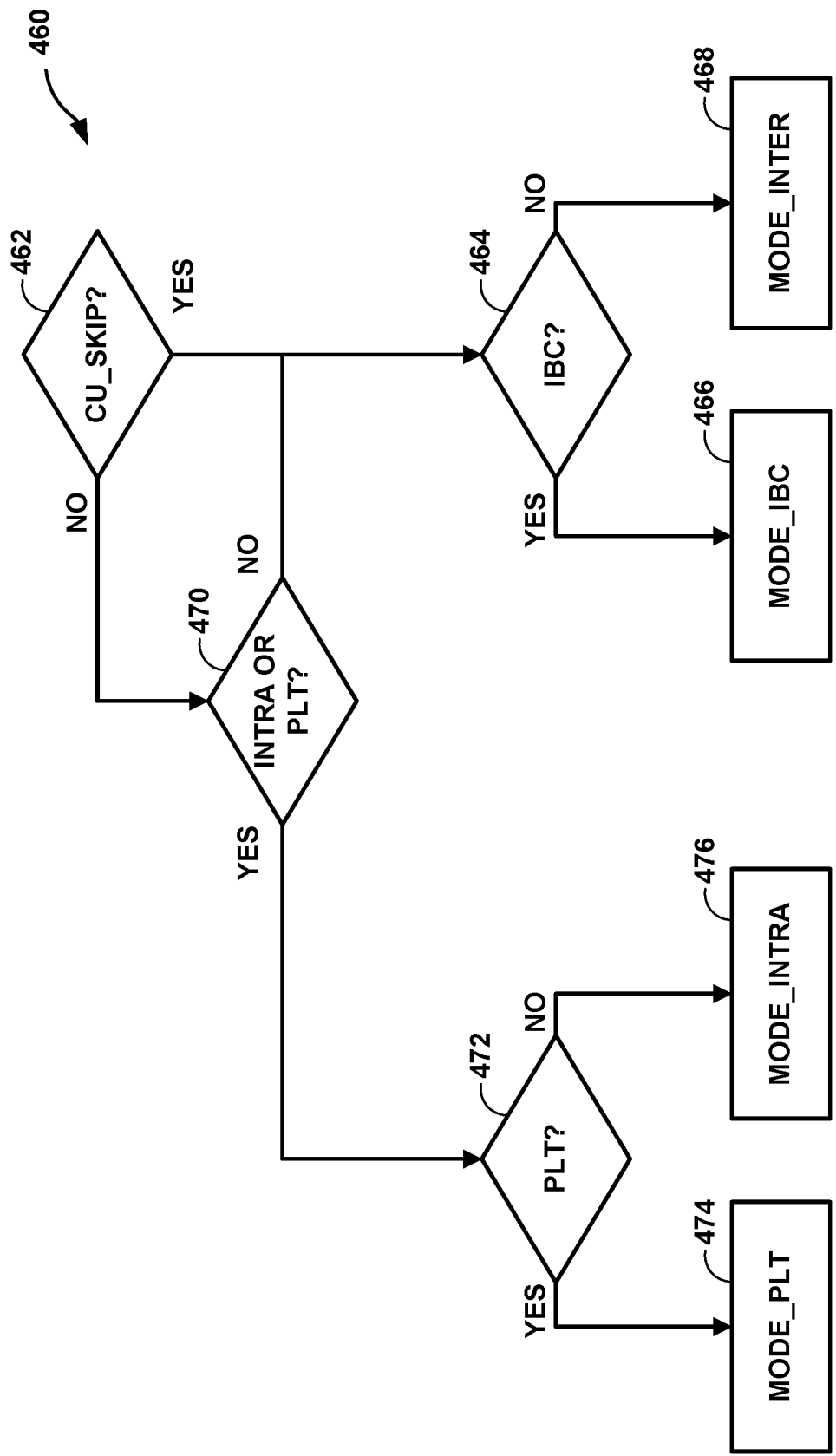
FIGS. 9-15 are diagrams illustrating an example of a unified palette and prediction signaling method according to techniques of the present disclosure.

According to the techniques of this disclosure, several example unified signaling schemes are presented. FIGS. 9-15 are diagrams illustrating an example of a unified palette and prediction signaling method according to techniques of the present disclosure. In one example, a unified mode signaling scheme is disclosed for both cases where IBC mode is enabled and where IBC mode is disabled, and for both I tiles/slices and P or B tiles/slices. When all four prediction modes are enabled, e.g., both palette mode and IBC mode are enabled in the SPS and for a P or B tile with a block size greater than 4×4, video encoder 200 and video decoder 300 may use the mode signaling as depicted in FIG. 9.

For example, video encoder 200 may determine a current mode for a current block of video data and signal the mode in a first, second and/or third bin, encode the current block of video data based on the current mode and include the bins in the encoded bitstream and video decoder 300 may parse the signals in the bins to determine the current mode and decode the video data based on the indicated current mode. In the example of FIG. 9, the first bin is signaled to indicate if the current CU is a skip mode CU. Video decoder 300 may determine whether the current CU is a skip mode CU, e.g., by parsing the first bin. If current CU is a skip mode CU, the second bin is signaled to indicate whether the current CU is encoded using MODE_IBC or not (in which case the current CU is encoded using MODE_INTER). Video decoder 300 may determine whether the current CU is encoded using MODE_IBC or not, e.g., by parsing the second bin. If the current CU is not a skip mode CU, the second bin is signaled to indicate whether the current CU is encoded using one of intra mode or palette mode. If the condition is TRUE (e.g., the current CU is encoded using one of intra mode or palette mode), the third bin is signaled to indicate if the current CU is encoded using MODE_PLT or not (in which case the current CU is encoded using MODE_INTRA). Otherwise, the third bin is signaled to indicate if the current CU is encoded using MODE_IBC or not (in which case the current CU is encoded using MODE_INTER).

For example, video decoder 300 may determine whether the current CU is a skip mode CU (462), e.g., by parsing the first bin. If the first bin is 1 (the "YES" path from block 462), video decoder 300 may determine whether the current CU is encoded using MODE_IBC or not (464), e.g., by parsing the second bin. If the first bin is 1 and the second bin is 1 (the "YES" path from block 464), video decoder 300 may determine the current CU is encoded using MODE_IBC (466) and video decoder 300 may decode the current CU using MODE_IBC. If the first bin is 1 and the second bin is 0 (the "NO" path from block 464), video decoder 300 may determine the current CU is encoded using MODE_INTER (468) and decode the current CU using MODE_INTER. If the first bin is 0 (the "NO" path from block 462), video decoder 300 may determine whether the current CU is encoded using one of intra mode or palette mode (470).

If the first bin is 0 and the second bin is 1 (the "YES" path from block 470), video decoder 300 may determine whether the current CU is encoded using MODE_PLT or not (472), e.g., by parsing the third bin. If the first bin is 0, the second bin is 1, and the third bin is 1 (the "YES" path from block 472), video decoder 300 may determine the current CU is encoded using MODE_PLT (474) and video decoder 300 may decode the current CU using MODE_PLT. If the first bin is 0, the second bin is 1 and the third bin is 0 (the "NO" path from block 472), video decoder 300 may determine the current CU was encoded using MODE_INTRA (476) and decode the current CU using MODE_INTRA.

If the first bin is 0 and the second bin is 0 (the "NO" path from block 470), video decoder 300 may determine whether the current CU is encoded using MODE_IBC or not (464), e.g., by parsing the third bin. If the first bin is 0, the second bin is 0 and the third bin is 1 (the "YES" path from block 464), video decoder 300 may determine the current CU was encoded using MODE_IBC (466) and video decoder 300 may decode the current CU using MODE_IBC. If the first bin is 0, the second bin is 0 and the third bin is 0 (the "NO"

path from block 464), video decoder 300 may determine the current CU is encoded using MODE_INTER (468) and video decoder 300 may decode the current CU using MODE_INTER.

Figure 10:
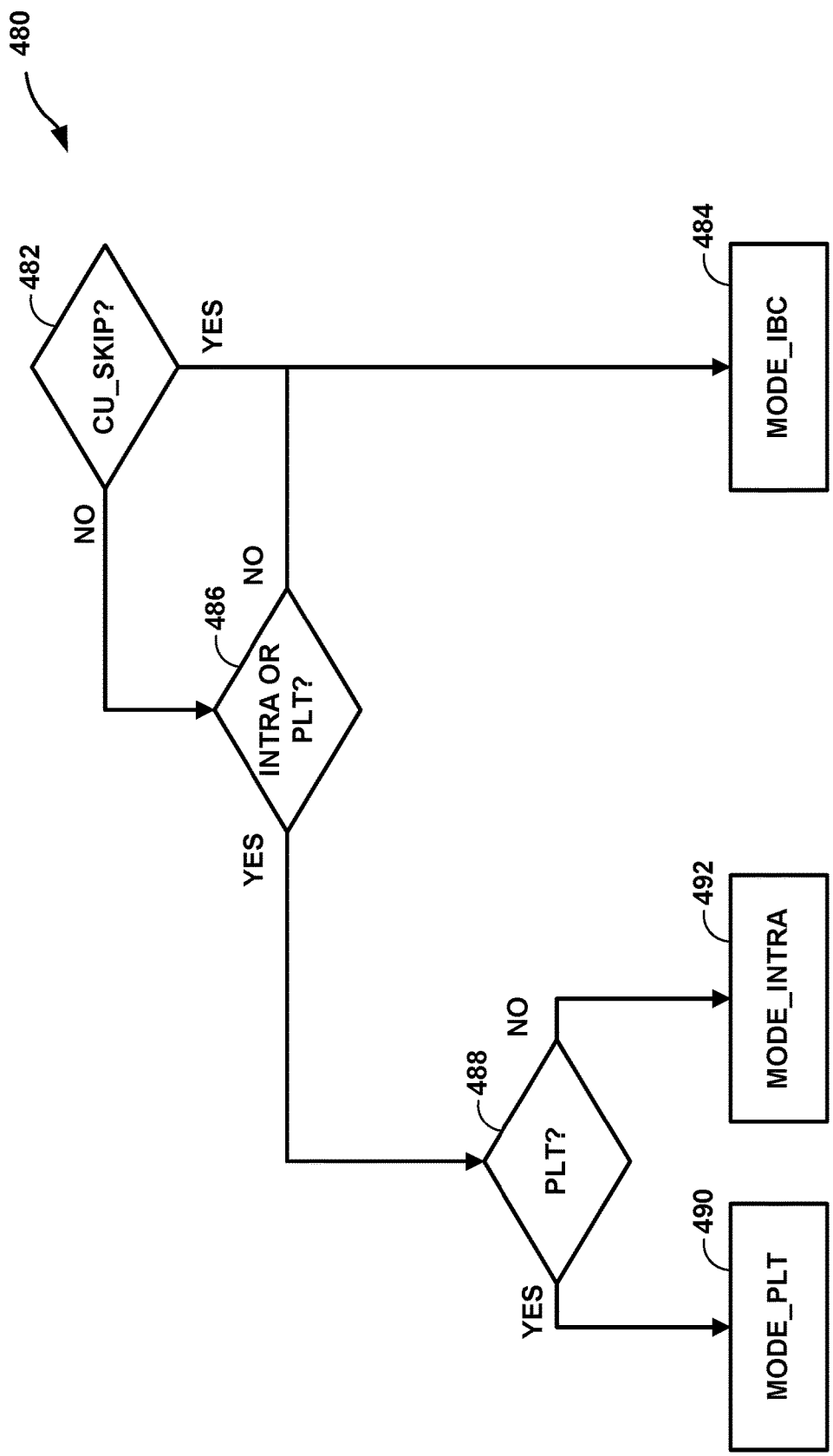

Based on the techniques of this disclosure, when INTER mode is disabled, e.g., in I tile/slice, for block size equal to or smaller than 4×4, etc., video encoder 200 and video decoder 300 may use the mode signaling scheme 480 shown in FIG. 10. The first bin is signaled to indicate if the current CU is a skip mode CU. If current CU is a skip mode CU, the current CU is encoded using MODE_IBC. If the current CU is not a skip mode CU, the second bin is signaled to indicate whether the current CU is encoded using one of intra mode or palette mode. If the condition is TRUE (e.g., the current CU is encoded using one of intra mode or palette mode), the third bin is signaled to indicate if the current CU is encoded using MODE_PLT or not (in which case the current CU is encoded using MODE_INTRA). Otherwise, the CU is encoded using MODE_IBC.

For example, video decoder 300 may determine whether the current CU is a skip mode CU (482), e.g., by parsing the first bin. If the first bin is 1 (the "YES" path from block 482), the video decoder 300 may determine the current CU is encoded using MODE_IBC (484), and video decoder 300 may decode the current CU using MODE_IBC. If the first bin is 0 (the "NO" path from block 482), video decoder 300 may determine whether the current CU is encoded using one of intra mode or palette mode (486). If the first bin is 0 and the second bin is 1 (the "YES" path from block 486), video decoder 300 may determine whether the current CU is encoded using MODE_PLT or not (488), e.g., by parsing the third bin. If the first bin is 0, the second bin is 1, and the third bin is 1 (the "YES" path from block 488), video decoder 300 may determine the current CU is encoded using MODE_PLT (490) and video decoder 300 may decode the current CU using MODE_PLT. If the first bin is 0, the second bin is 1 and the third bin is 0 (the "NO" path from block 488), video decoder 300 may determine the current CU was encoded using MODE_INTRA (492) and decode the current CU using MODE_INTRA. If the first bin is 0 and the second bin is 0 (the "NO" path from block 486), video decoder 300 may determine the current CU was encoded using MODE_IBC (484) and video decoder 300 may decode the current CU using MODE_IBC.

Figure 11:
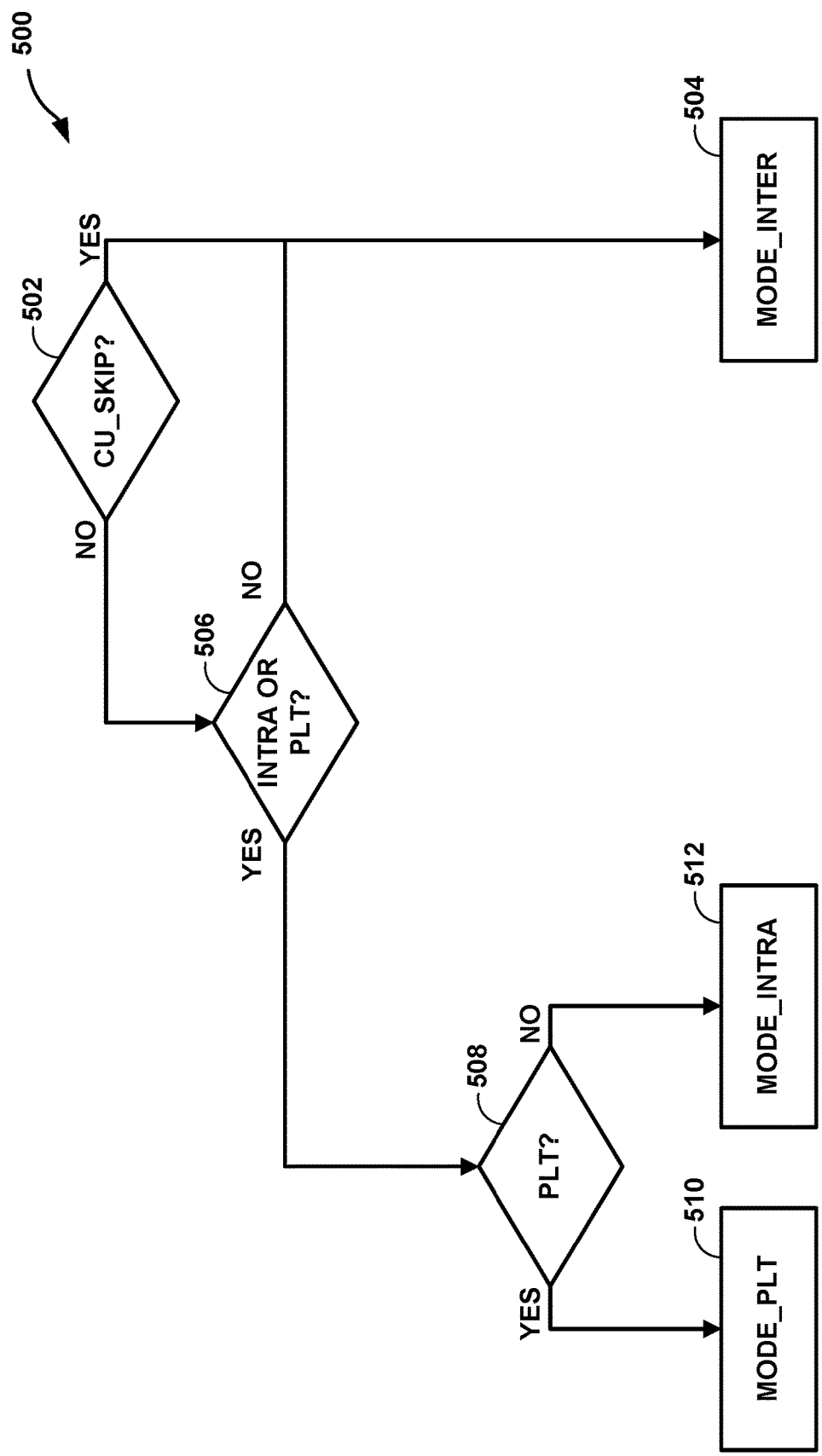

Based on the techniques of this disclosure, when IBC mode is disabled, e.g., when IBC mode is disabled in the SPS, e.g., for a chroma block when dual tree is used, etc., video encoder 200 and video decoder 300 may use the mode signaling scheme 500 as shown in FIG. 11. In the example of FIG. 11, the first bin is signaled to indicate if the current CU is a skip mode CU. If current CU is a skip mode CU, the current CU is encoded using MODE_INTER. If the current CU is not a skip mode CU, the second bin is signaled to indicate whether the current CU is encoded using one of intra mode or palette mode. If the condition is TRUE (e.g., the current CU is encoded using one of intra mode or palette mode), the third bin is signaled to indicate if the current CU is encoded using MODE_PLT or not (in which case the current CU is encoded using MODE_INTRA). Otherwise, the current CU is encoded using MODE_INTER. This unifies the palette mode coding (to be signaled in intra mode path) for both when IBC mode is enabled and when IBC mode is disabled as the signaling examples follow similar paths.

For example, video decoder 300 determine whether the current CU is a skip mode CU (502), e.g., by parsing the first bin. If the first bin is 1 (the "YES" path from block 502), the video decoder 300 may determine the current CU is encoded using MODE_INTER (504) and decode the current CU using MODE_INTER. If the first bin is 0 (the "NO" path from block 502), video decoder 300 may determine whether the current CU is encoded using one of intra mode or palette mode (506). If the first bin is 0 and the second bin is 1 (the "YES" path from block 506), video decoder 300 may determine whether the current CU is encoded using MODE_PLT or not (508), e.g., by parsing the third bin. If the first bin is 0, the second bin is 1, and the third bin is 1 (the "YES" path from block 508), video decoder 300 may determine the current CU is encoded using MODE_PLT (510) and video decoder 300 may decode the current CU using MODE_PLT. If the first bin is 0, the second bin is 1 and the third bin is 0 (the "NO" path from block 508), video decoder 300 may determine the current CU was encoded using MODE_INTRA (512) and decode the current CU using MODE_INTRA. If the first bin is 0 and the second bin is 0 (the "NO" path from block 506), video decoder 300 may determine the current CU is encoded using MODE_INTER (468) and video decoder 300 may decode the current CU using MODE_INTER.

Figure 12:
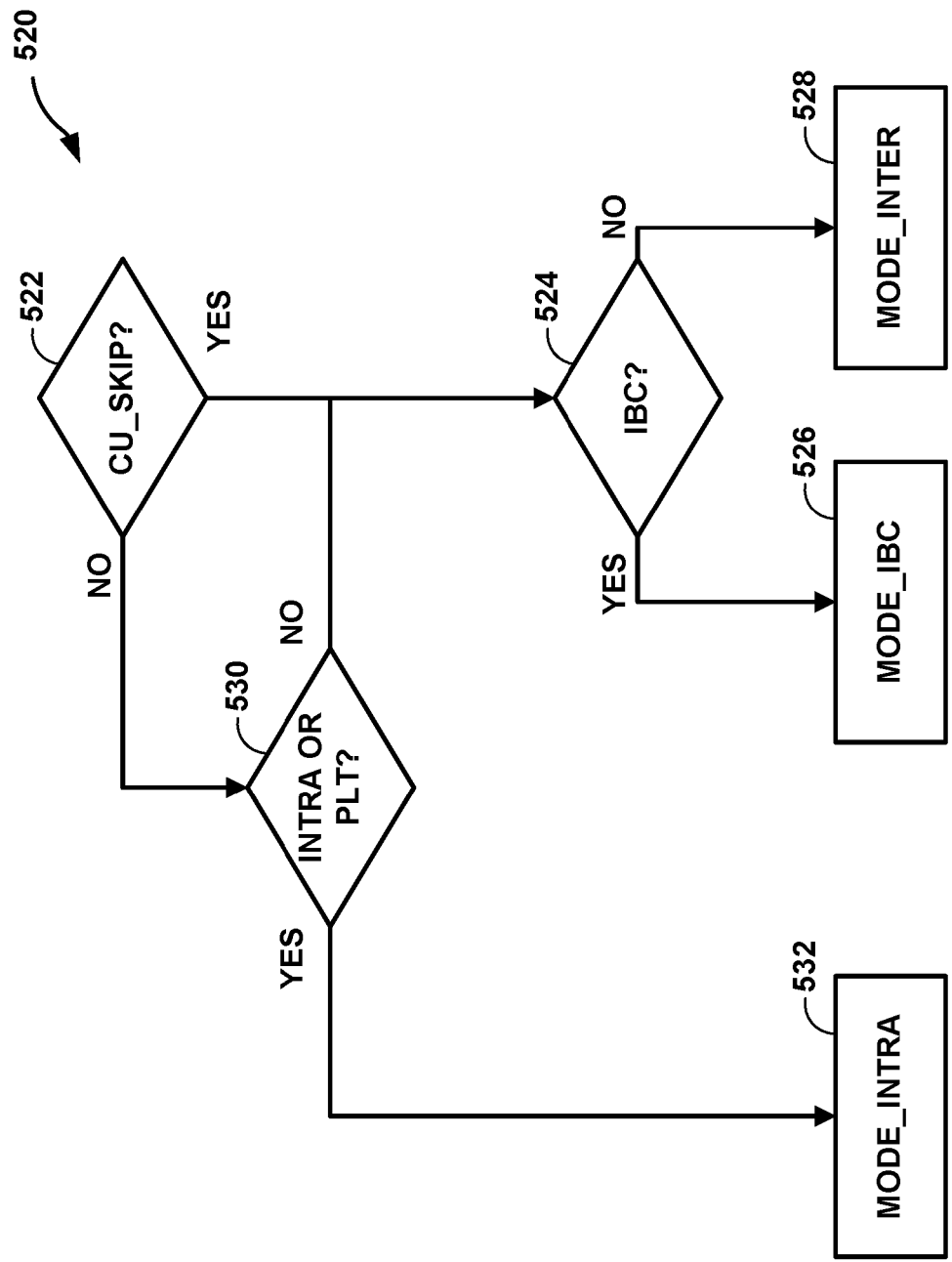

Based on the techniques of this disclosure, when palette mode is disabled, e.g., when PLT is disabled in the SPS, for example when a block size is larger than 64×64, etc., video encoder 200 and video decoder 300 may use the mode signaling scheme 520 as shown in FIG. 12. In the example of FIG. 12, the first bin is signaled to indicate if the current CU is a skip mode CU. If current CU is a skip mode CU, the second bin is signaled to indicate whether the current CU is encoded using MODE_IBC or not (in which case the current CU is encoded using MODE_INTER). If the current CU is not a skip mode CU, the second bin is signaled to indicate whether the current CU is encoded using one of intra mode or palette mode. If the condition is TRUE (e.g., the current CU is encoded using one of intra mode or palette mode), the current CU is encoded using MODE_INTRA, as palette mode is disabled. Otherwise, the third bin is signaled to indicate if the current CU is encoded using MODE_IBC or not (in which case the current CU is encoded using MODE_INTER).

For example, video decoder 300 may determine whether the current CU is a skip mode CU (522), e.g., by parsing the first bin. If the first bin is 1 (the "YES" path from block 522), the video decoder 300 may determine whether the current CU is encoded using MODE_IBC or not (524), e.g., by parsing the second bin. If the first bin is 1 and the second bin is 1 (the "YES" path from block 524), video decoder 300 may determine the current CU is encoded using MODE_IBC (526) and video decoder 300 may decode the current CU using MODE_IBC. If the first bin is 1 and the second bin is 0 (the "NO" path from block 524), video decoder 300 may determine the current CU is encoded using MODE_INTER (528) and decode the current CU using MODE_INTER. If the first bin is 0 (the "NO" path from block 522), video decoder 300 may determine whether the current CU is encoded using one of intra mode or palette mode (530).

If the first bin is 0 and the second bin is 1 (the "YES" path from block 530), video decoder 300 may determine the current CU was encoded using MODE_INTRA (532) and decode the current CU using MODE_INTRA, as palette mode is disabled. If the first bin is 0 and the second bin is 0 (the "NO" path from block 530), video decoder 300 may determine whether the current CU is encoded using MODE_IBC or not (524), e.g., by parsing the third bin. If the first bin is 0, the second bin is 0 and the third bin is 1 (the "YES" path from block 524), video decoder 300 may determine the current CU was encoded using MODE_IBC (526) and video decoder 300 may decode the current CU using MODE_IBC. If the first bin is 0, the second bin is 0 and the third bin is 0 (the "NO" path from block 524), video decoder 300 may determine the current CU is encoded using MODE_INTER (528) and video decoder 300 may decode the current CU using MODE_INTER.

Figure 13:
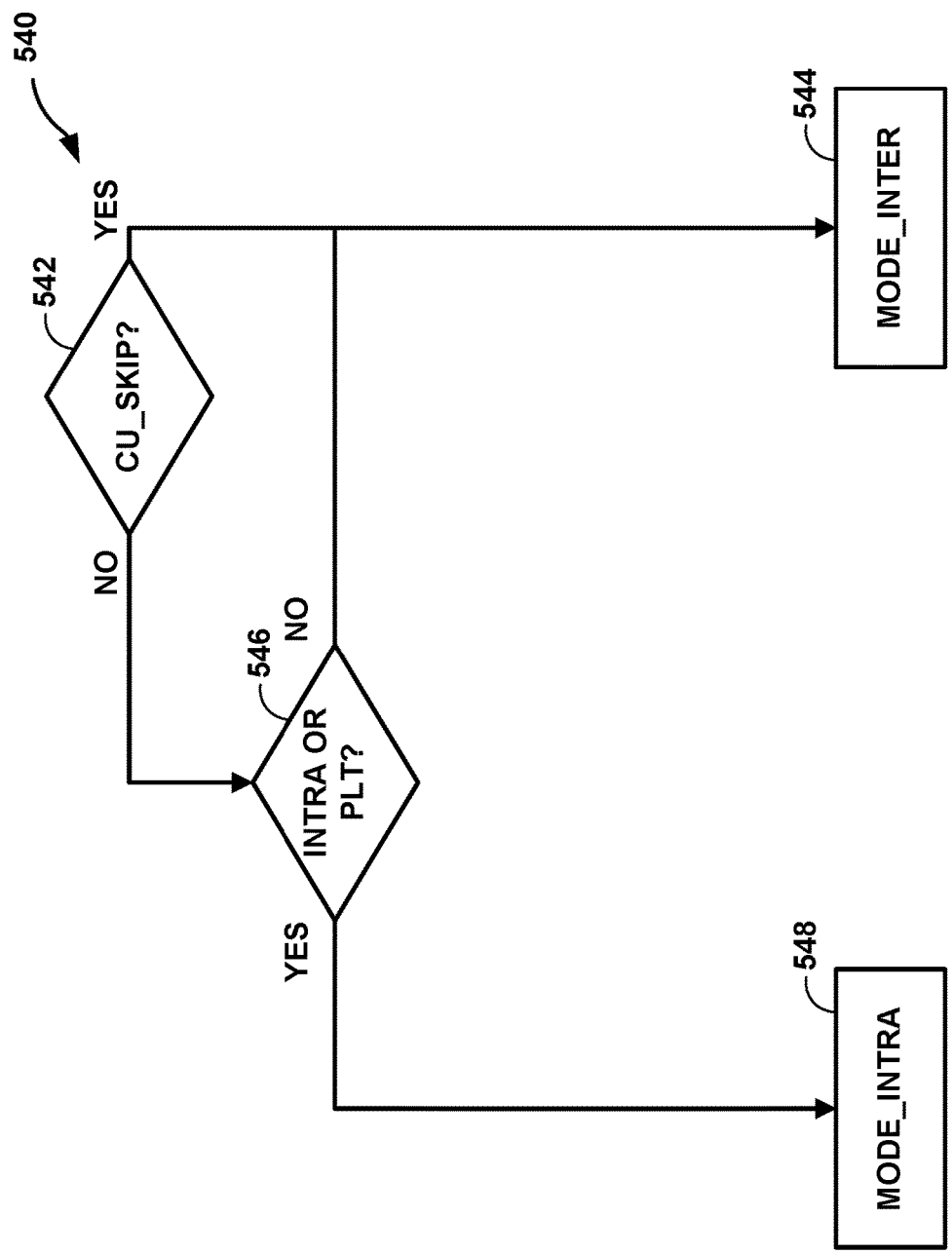

Based on the techniques of this disclosure, when both IBC mode and palette mode are disabled, video encoder 200 and video decoder 300 may use the mode signaling scheme 540 as shown in FIG. 13. In the example of FIG. 13, the first bin is signaled to indicate if the current CU is a skip mode CU. If current CU is a skip mode CU, the current CU is encoded using MODE_INTER. If the current CU is not a skip mode CU, the second bin is signaled to indicate whether the current CU is encoded using one of intra mode or palette mode. If the condition is TRUE (e.g., the current CU is encoded using one of intra mode or palette mode), the current CU is encoded using MODE_INTRA, as palette mode is disabled. Otherwise, the current CU is encoded using MODE_INTER.

For example, video decoder 300 may determine whether the current CU is a skip mode CU (542), e.g., by parsing the first bin. If the first bin is 1 (the "YES" path from block 542), the video decoder 300 may determine the current CU is encoded using MODE_INTER (544) and decode the current CU using MODE_INTER. If the first bin is 0 (the "NO" path from block 542), video decoder 300 may determine whether the current CU is encoded using one of intra mode or palette mode (546). If the first bin is 0 and the second bin is 1 (the "YES" path from block 470), video decoder 300 may determine the current CU is encoded using MODE_PLT (474) and video decoder 300 may decode the current CU using MODE_PLT. If the first bin is 0, the second bin is 1 (the "NO" path from block 546), video decoder 300 may determine the current CU was encoded using MODE_INTER (544), and decode the current CU using MODE_INTER.

Figure 14:
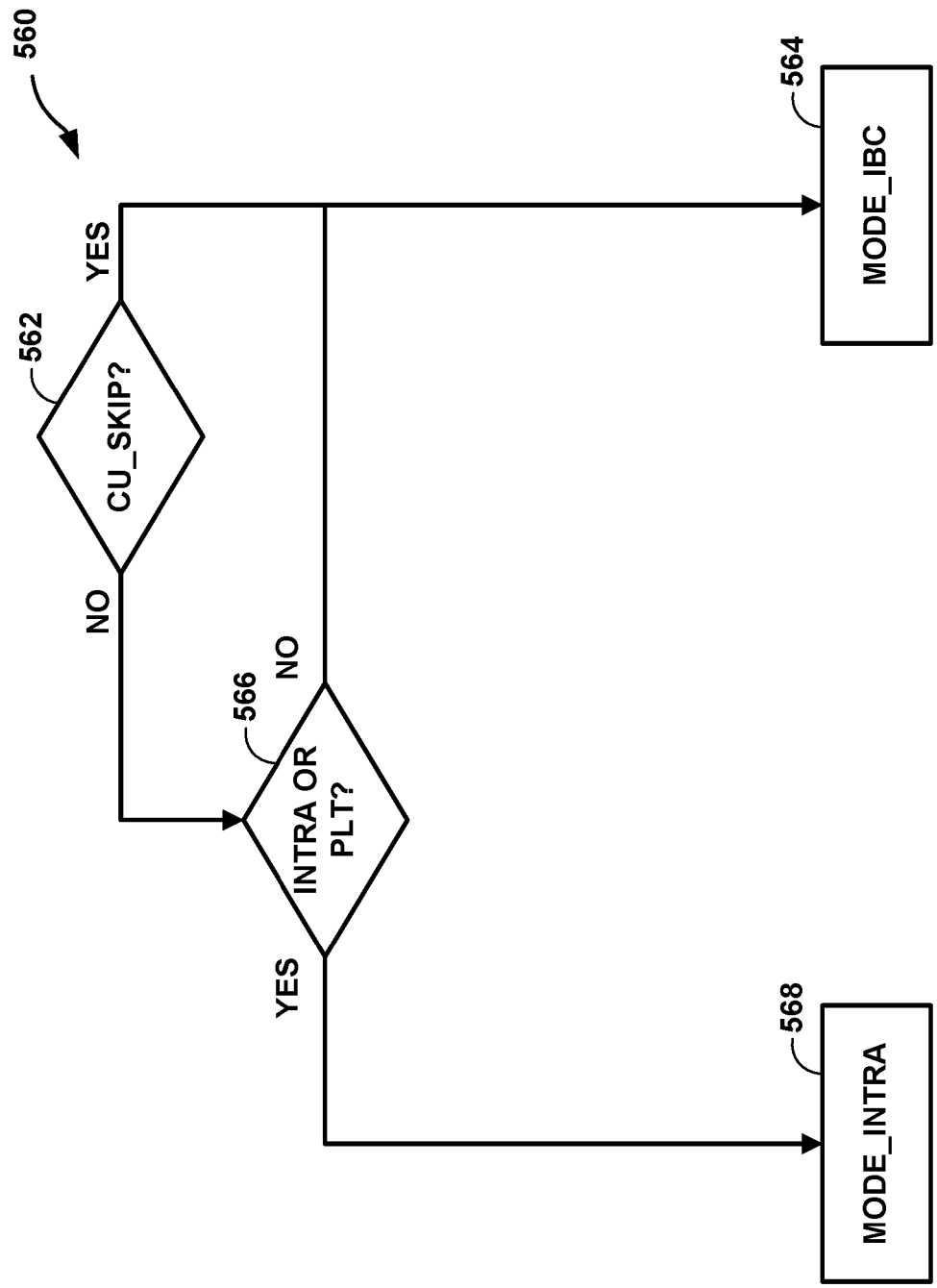

Based on the techniques of the current disclosure, when both inter mode and palette mode are disabled, video encoder 200 and video decoder 300 may use the mode signaling scheme 560 as shown in FIG. 14. In the example of FIG. 14, the first bin is signaled to indicate if the current CU is a skip mode CU. If the current CU is a skip mode CU, the current CU is encoded using MODE_IBC. If the current CU is not a skip mode CU, the second bin is signaled to indicate whether the current CU is encoded using one of intra mode or palette mode. If the condition is TRUE (e.g., the current CU is encoded using one of intra mode or palette mode), the current CU is encoded using MODE_INTRA, as palette mode is disabled. Otherwise, the current CU is encoded using MODE_IBC.

For example, video decoder 300 may determine whether the current CU is a skip mode CU (562), e.g., by parsing the first bin. If the first bin is 1 (the "YES" path from block 562), the video decoder 300 may determine the current CU is encoded using MODE_IBC (564) and video decoder 300 may decode the current CU using MODE_IBC. If the first bin is 0 (the "NO" path from block 562), video decoder 300 may determine whether the current CU is encoded using one of intra mode or palette mode (566). If the first bin is 0 and the second bin is 1 (the "YES" path from block 566), video decoder 300 may determine the current CU was encoded using MODE_INTRA (568) and decode the current CU using MODE_INTRA. If the first bin is 0 and the second bin is 0 (the "NO" path from block 566), video decoder 300 may determine the current CU was encoded using MODE_IBC (466) and video decoder 300 may decode the current CU using MODE_IBC.

Figure 15:
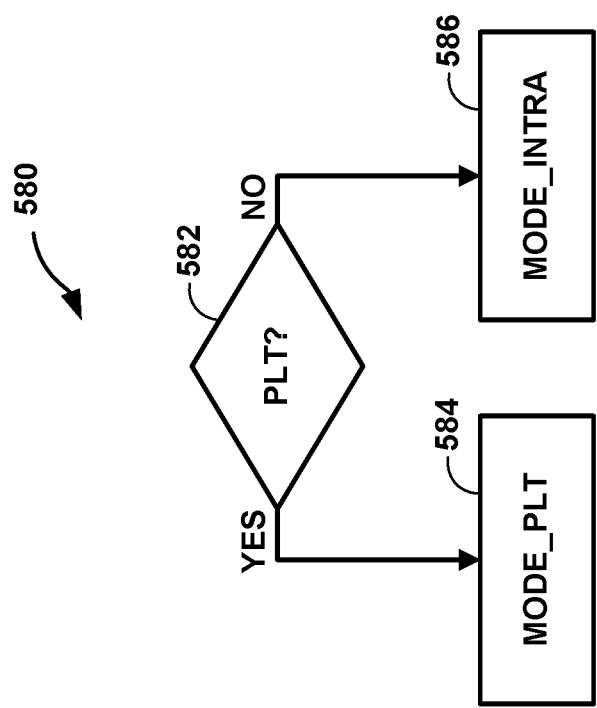

Based on the techniques of this disclosure, when both INTER mode and IBC mode are disabled, video encoder 200 and video decoder 300 may use the mode signaling scheme 580 as shown in FIG. 15. One bin is signaled to indicate if the current CU is encoded using MODE_PLT or not (in which case the current CU is encoded using MODE_INTRA).

For example, video decoder 300 may determine whether the current CU is encoded using MODE_PLT (582), e.g., by parsing the first bin. If the first bin is 1 (the "YES" path in FIG. 15), video decoder 300 may determine the current CU is encoded using MODE_PLT (584) and video decoder 300 may decode the current CU using MODE_PLT. If the first bin is 0, (the "NO" path in FIG. 15), video decoder 300 may determine the current CU was encoded using MODE_INTRA (476) and decode the current CU using MODE_INTRA.

In the example of FIGS. 9-14, the flag indicating whether the current prediction mode of the current CU is one of MODE_INTRA or MODE_PLT may be context coded. The context modeling may be based on the prediction mode of the neighboring block(s), such as the CU above (cuAbove 452)) and the CU on the left (cuLeft 454)) of the current block (450) as shown in FIG. 8. Below are some examples: The context index can be determined as follows:

> ctxIdx=1 if cuAbove is (MODE_INTRA or MODE_PLT) or cuLeft is (MODE_INTRA or MODE_PLT)
>
> ctxIdx=0 Otherwise The context index can be determined as follows:

> ctxIdx=2 if cuAbove is (MODE_INTRA or MODE_PLT) and cuLeft is (MODE_INTRA or MODE_PLT)
>
> Otherwise,
>
> ctxIdx=1 if cuAbove is (MODE_INTRA or MODE_PLT) or cuLeft is (MODE_INTRA or MODE_PLT)
>
> ctxIdx=0 if neither cuAbove is (MODE_INTRA or MODE_PLT) nor cuLeft is (MODE_INTRA or MODE_PLT)

Figure 16:
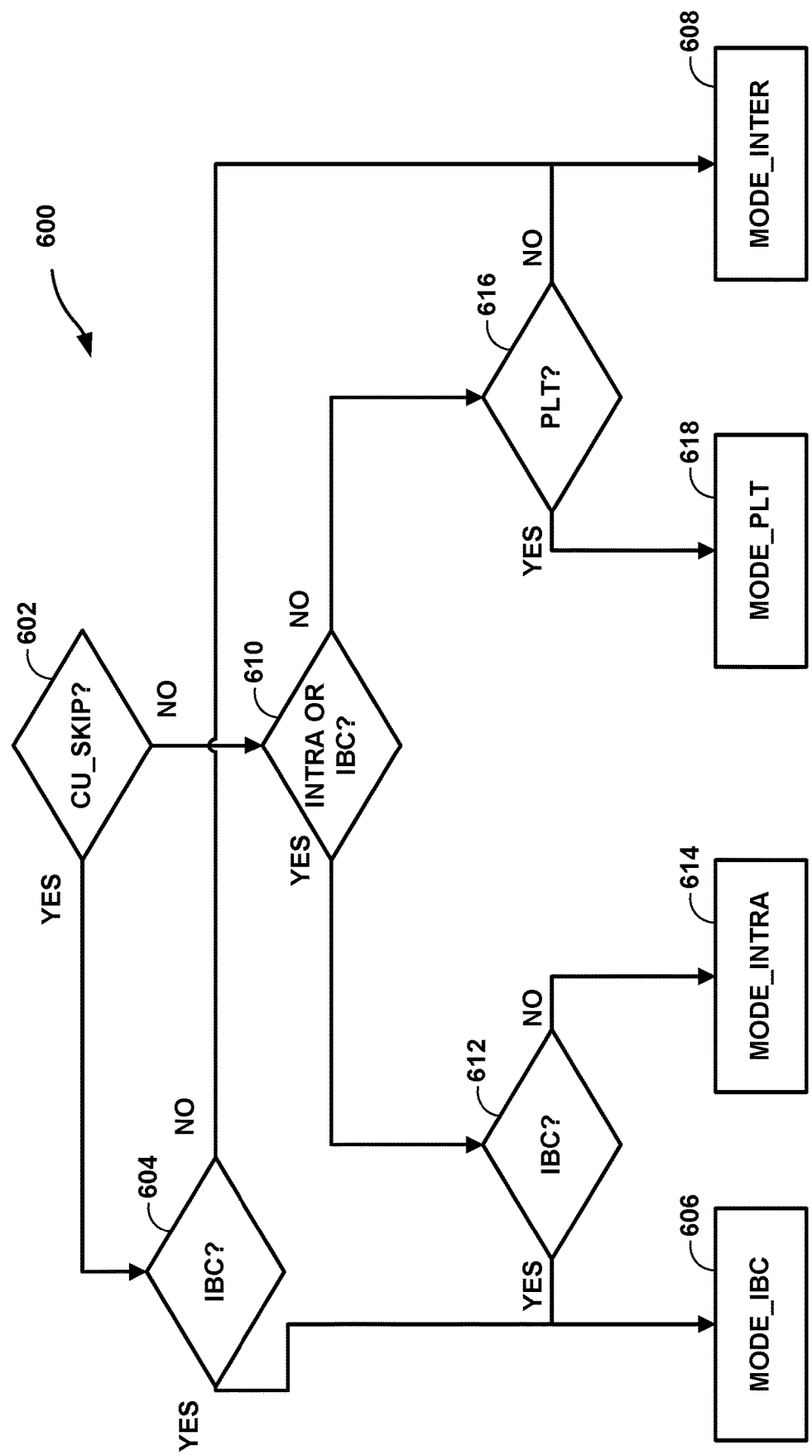
FIGS. 16-18 are diagrams illustrating another example of a unified palette and prediction signaling method according to techniques of the present disclosure.
Figure 17:
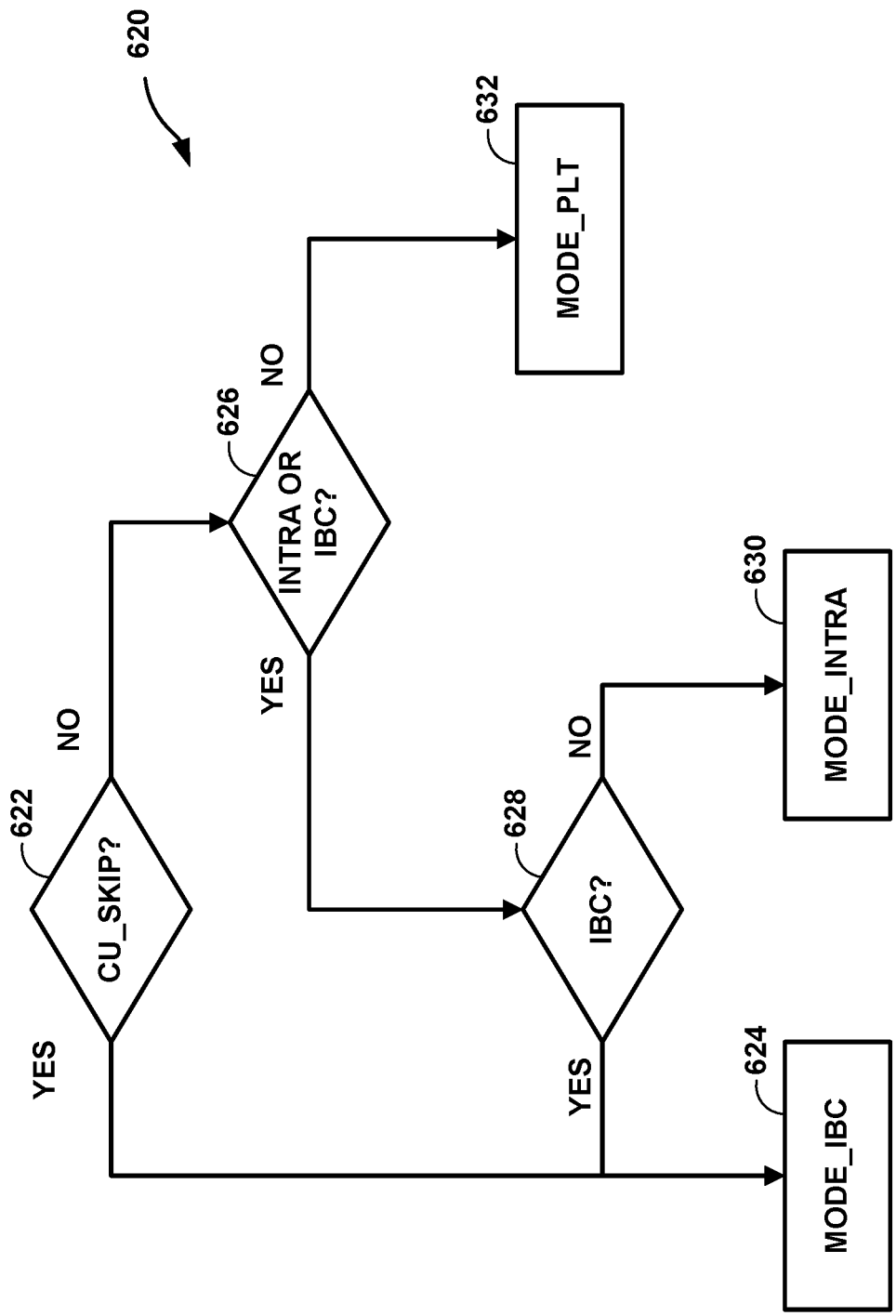
Figure 18:
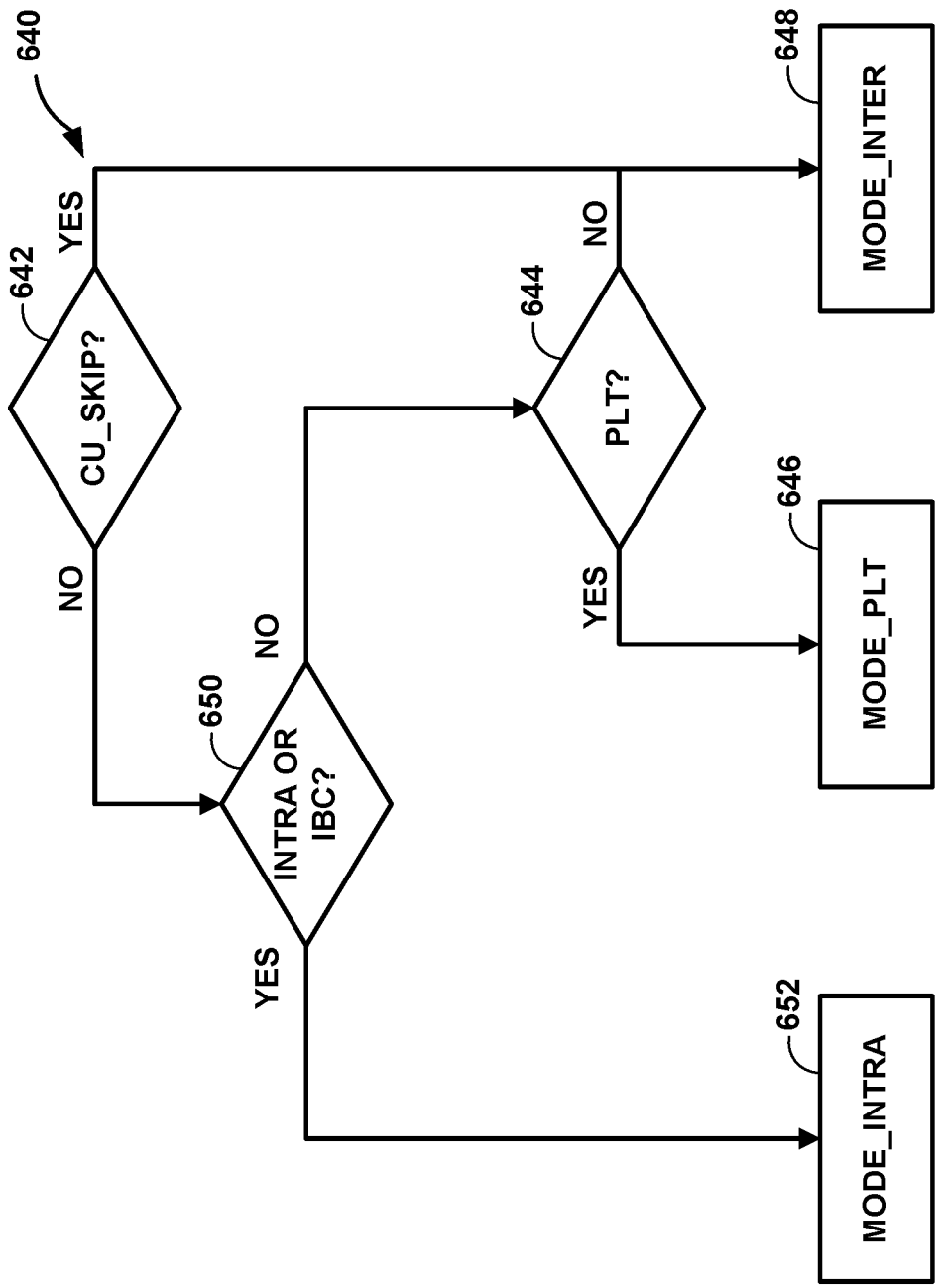

FIGS. 16-18 are diagrams illustrating another example of a unified palette and prediction signaling method according to techniques of the present disclosure. In this example, according to the techniques of this disclosure, another unified mode signaling variant is proposed for both cases where IBC is enabled and where IBC is disabled, and for both I tiles/slices and P or B tiles/slices. When all four prediction modes are enabled, e.g., both palette mode and IBC mode are enabled in the SPS and for a P or B tile or slice with a block size greater than 4×4, video encoder 200 and video decoder 300 may use the mode signaling scheme 600 as depicted in FIG. 16. In this example unified mode signaling variant, as in the examples of FIGS. 9-15, video encoder 200 may determine a current mode for a current block of video data and signal the current mode in a first, second and/or third bin, encode the current block of video data based on the current mode and include the bins in the encoded bitstream and video decoder 300 may parse the signals in the bins to determine the current mode and decode the video data based on the indicated current mode.

In the example of FIG. 16, the first bin is signaled to indicate if the current CU is a skip mode CU. If the current CU is a skip mode CU, the second bin is signaled to indicate whether the current CU is encoded using MODE_IBC or not (in which case the current CU is encoded using MODE_INTER). If the current CU is not a skip mode CU, the second bin is signaled to indicate whether the current CU is encoded using one of intra mode or intra block copy mode. If the condition is TRUE (e.g., the current CU is encoded using one of intra mode or intra block copy mode), the third bin is signaled to indicate if the current CU is encoded using MODE_IBC or not (in which case the current CU is encoded using MODE_INTRA). Otherwise, the third bin is signaled to indicate if the current CU is encoded using MODE_PLT or not (in which case the current CU is encoded using MODE_INTER).

For example, video decoder 300 may determine whether the current CU is a skip mode CU (602), e.g., by parsing the first bin. If the first bin is 1 (the "YES" path from block 602), the video decoder 300 may determine whether the current CU is encoded using MODE_IBC or not (604), e.g., by parsing the second bin. If the first bin is 1 and the second bin is 1 (the "YES" path from block 604), video decoder 300 may determine the current CU is encoded using MODE_IBC (606) and video decoder 300 may decode the current CU using MODE_IBC. If the first bin is 1 and the second bin is 0 (the "NO" path from block 604), video decoder 300 may determine the current CU is encoded using MODE_INTER (608) and decode the current CU using MODE_INTER. If the first bin is 0 (the "NO" path from block 602), video decoder 300 may determine whether the current CU is encoded using one of intra mode or IBC mode (610). If the first bin is 0 and the second bin is 1 (the "YES" path from block 610), video decoder 300 may determine whether the current CU is encoded using IBC mode or not (612), e.g., by parsing the third bin. If the first bin is 0, the second bin is 1, and the third bin is 1 (the "YES" path from block 612), video decoder 300 may determine the current CU is encoded using IBC mode (606) and video decoder 300 may decode the current CU using MODE_IBC. If the first bin is 0, the second bin is 1 and the third bin is 0 (the "NO" path from block 612), video decoder 300 may determine the current CU was encoded using MODE_INTRA (614) and decode the current CU using MODE_INTRA. If the first bin is 0 and the second bin is 0 (the "NO" path from block 610), video decoder 300 may determine whether the current CU is encoded using MODE_PLT or not (616), e.g., by parsing the third bin. If the first bin is 0, the second bin is 0 and the third bin is 1 (the "YES" path from block 616), video decoder 300 may determine the current CU was encoded using MODE_PLT (618) and video decoder 300 may decode the current CU using MODE_PLT. If the first bin is 0, the second bin is 0 and the third bin is 0 (the "NO" path from block 616), video decoder 300 may determine the current CU is encoded using MODE_INTER (608) and video decoder 300 may decode the current CU using MODE_INTER.

The extension of this mode signaling variant to cases where some modes are not enabled may be similar to the examples of FIGS. 10-15.

For example, based on the techniques of this disclosure, when INTER mode is disabled, e.g., in I tiles/slices, for block size equal to or smaller than 4×4, etc., video encoder 200 and video decoder 300 may use the mode signaling scheme 620 as shown in FIG. 17. In the example of FIG. 17, the first bin is signaled to indicate if the current CU is a skip mode CU. If current CU is a skip mode CU, the current CU is encoded using MODE_IBC. If the current CU is not a skip mode CU, the second bin is signaled to indicate whether the current CU is encoded using one of intra mode or intra block copy mode. If the condition is TRUE (e.g., the current CU is encoded using one of intra mode or intra block copy mode), the third bin is signaled to indicate if the current CU is encoded using MODE_IBC or not (in which case the current CU is encoded using MODE_INTRA). Otherwise, the current CU is encoded using MODE_PLT.

For example, video decoder 300 may determine whether the current CU is a skip mode CU (622), e.g., by parsing the first bin. If the first bin is 1 (the "YES" path from block 622), the video decoder 300 may determine the current CU is encoded using MODE_IBC (624) and video decoder 300 may decode the current CU using MODE_IBC. If the first bin is 0 (the "NO" path from block 622), video decoder 300 may determine whether the current CU is encoded using one of intra mode or IBC mode (626). If the first bin is 0 and the second bin is 1 (the "YES" path from block 626), video decoder 300 may determine whether the current CU is encoded using IBC mode or not (612), e.g., by parsing the third bin. If the first bin is 0, the second bin is 1, and the third bin is 1 (the "YES" path from block 628), video decoder 300 may determine the current CU is encoded using IBC mode (624) and video decoder 300 may decode the current CU using MODE_IBC. If the first bin is 0, the second bin is 1 and the third bin is 0 (the "NO" path from block 628), video decoder 300 may determine the current CU was encoded using MODE_INTRA (630) and decode the current CU using MODE_INTRA. If the first bin is 0 and the second bin is 0 (the "NO" path from block 626), video decoder 300 may determine the current CU was encoded using MODE_PLT (632) and video decoder 300 may decode the current CU using MODE_PLT.

Based on the techniques of this disclosure, when IBC is disabled, e.g., when IBC is disabled in the SPS, for example for a chroma block when dual tree is used, etc. video encoder 200 and video decoder 300 may use the mode signaling scheme 640 as shown in FIG. 18. In the example of FIG. 18, the first bin is signaled to indicate if the current CU is a skip mode CU. If the current CU is a skip mode CU, the current CU is encoded using MODE_INTER. If the current CU is not a skip mode CU, the second bin is signaled to indicate whether the current CU is encoded using one of intra mode or intra block copy mode. If the condition is TRUE (e.g., the current CU is encoded using one of intra mode or intra block copy mode), the current CU is encoded using MODE_INTRA, as intra block copy mode is disabled. Otherwise, the third bin is signaled to indicate if the current CU is encoded using MODE_PLT or not (in which case the current CU is encoded using MODE_INTER).

For example, video decoder 300 may determine whether the current CU is a skip mode CU (642), e.g., by parsing the first bin. If the first bin is 1 (the "YES" path from block 642), the video decoder 300 may determine the current CU is encoded using MODE_INTER (648) and decode the current CU using MODE_INTER. If the first bin is 0 (the "NO" path from block 602), video decoder 300 may determine whether the current CU is encoded using one of intra mode or IBC mode (650), e.g., by parsing the second bin. If the first bin is 0 and the second bin is 1 (the "YES" path from block 650), video decoder 300 may determine the current CU was encoded using MODE_INTRA (652) and decode the current CU using MODE_INTRA. If the first bin is 0 and the second bin is 0 (the "NO" path from block 650), video decoder 300 may determine whether the current CU is encoded using MODE_PLT or not (644), e.g., by parsing the third bin. If the first bin is 0, the second bin is 0 and the third bin is 1 (the "YES" path from block 644), video decoder 300 may determine the current CU was encoded using MODE_PLT (646) and video decoder 300 may decode the current CU using MODE_PLT. If the first bin is 0, the second bin is 0 and the third bin is 0 (the "NO" path from block 644), video decoder 300 may determine the current CU is encoded using MODE_INTER (648) and video decoder 300 may decode the current CU using MODE_INTER.

Figure 19:
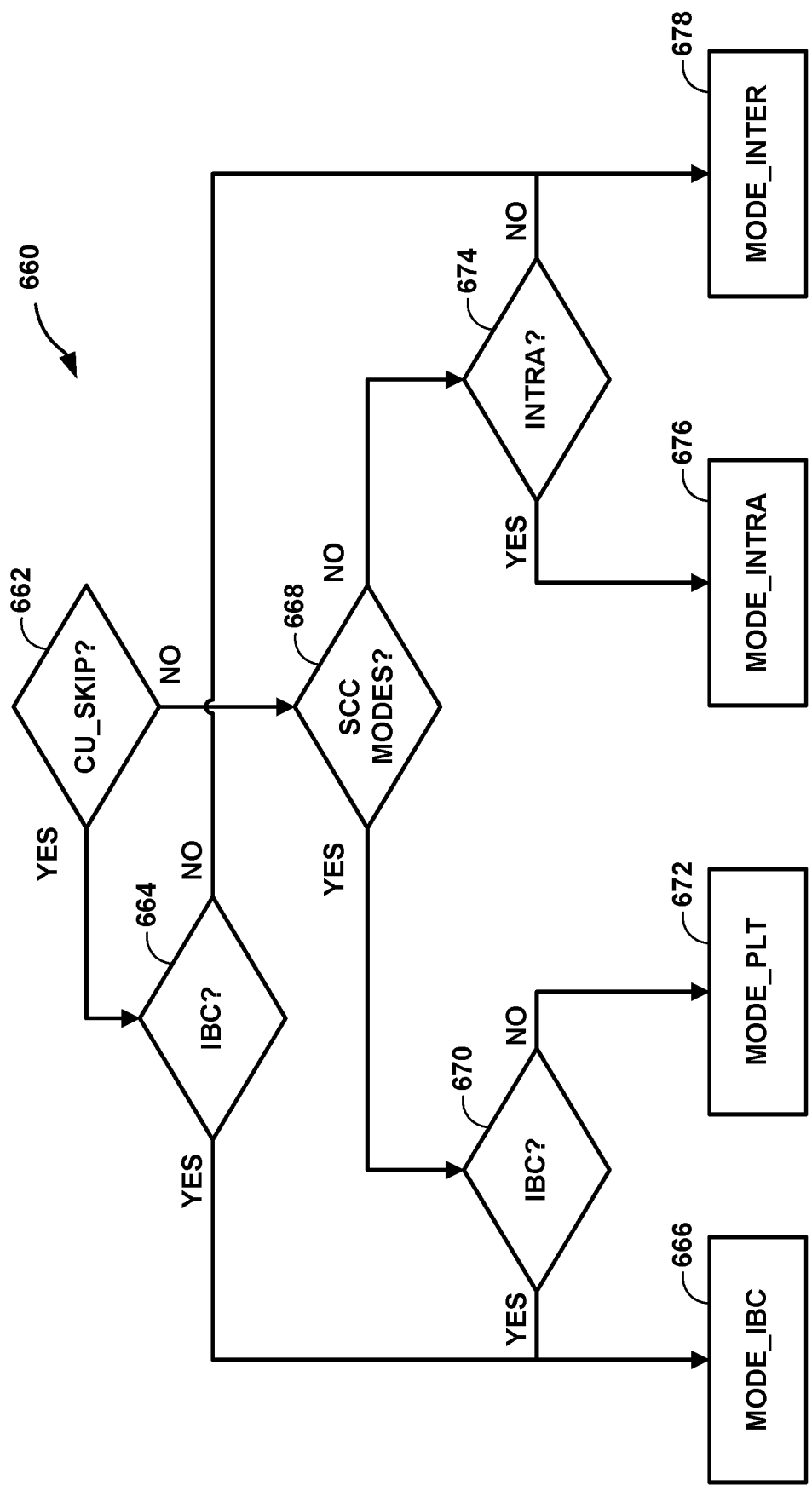
FIGS. 19-20 are diagrams illustrating yet another example of a unified palette and prediction signaling method according to techniques of the present disclosure.
Figure 20:
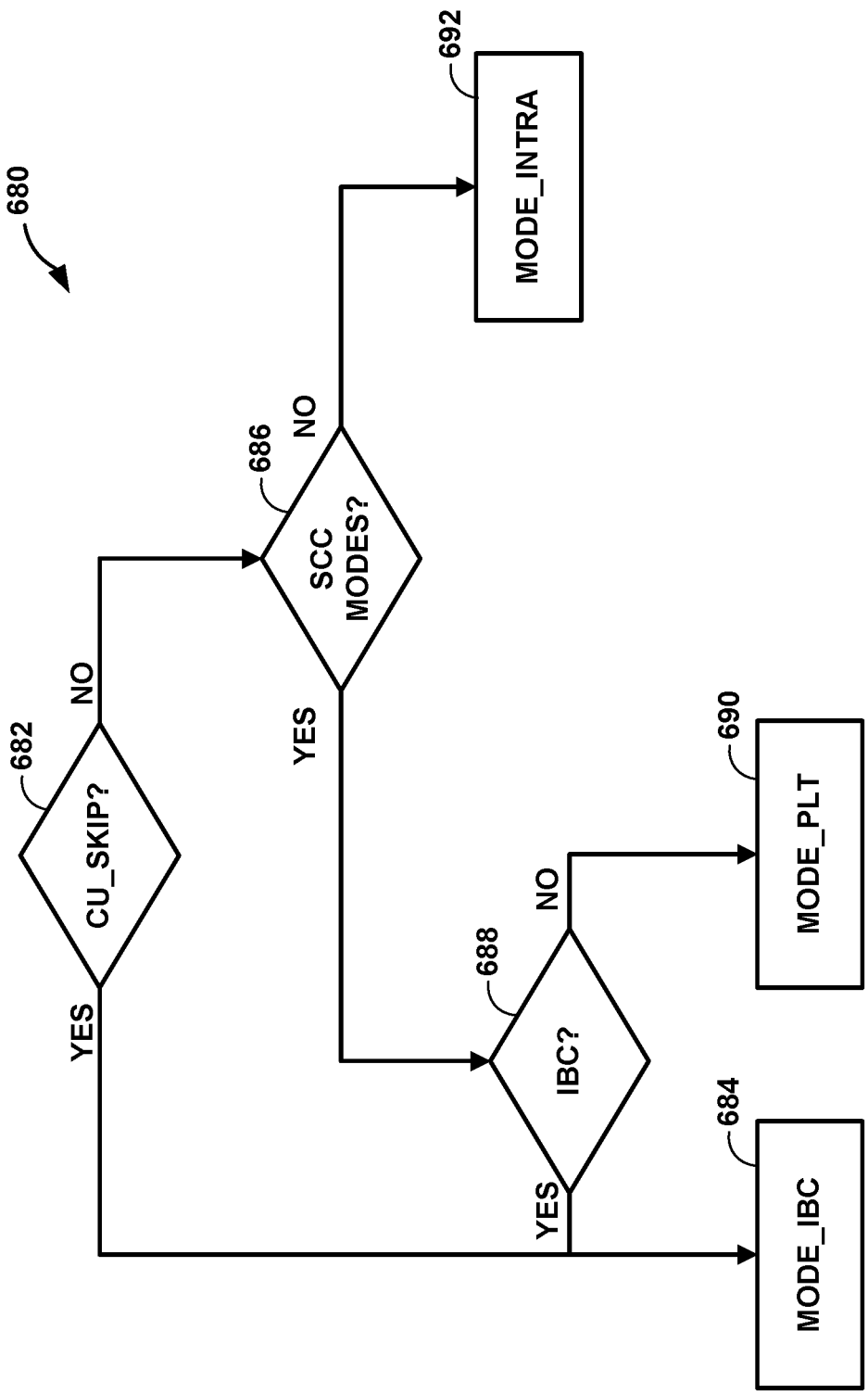

FIGS. 19-20 are diagrams illustrating yet another example of a unified palette and prediction signaling method according to techniques of the present disclosure. According to the techniques of this disclosure, yet another unified mode signaling variant is disclosed for both cases of where IBC is enabled and where IBC is disabled, and for both I tiles/slices and P or B tiles/slices. When all four modes are enabled, e.g., both palette and IBC are enabled in the SPS and for P or B tiles with a block size greater than 4×4, video encoder 200 and video decoder 300 may use the mode signaling scheme 660 as depicted in FIG. 19. As with other two unified signaling schemes discussed above, video encoder 200 may determine a current prediction mode of a current block of video data and signal the current prediction mode in a first, second and/or third bin, encode the current block of video data based on the current prediction mode and include the bins in the encoded bitstream and video decoder 300 may parse the signals in the bins to determine the current prediction mode and decode the video data based on the indicated current prediction mode. In the example of FIG. 19, the first bin is signaled to indicate if the current CU is a skip mode CU. If the current CU is a skip mode CU, the second bin is signaled to indicate the current CU is encoded using MODE_IBC or not (in which case the current CU is encoded using MODE_INTER). If the current CU is not a skip mode CU, the second bin is signaled to indicate whether the current CU is encoded using one of palette mode or intra block copy mode (e.g., screen content coding modes, SCC). If the condition is TRUE (e.g., the current CU is encoded using one of palette mode or intra block copy mode), the third bin is signaled to indicate if the current CU is encoded using MODE_IBC or not (in which case the current CU is encoded using MODE_PLT). Otherwise, the third bin is signaled to indicate if the current CU is encoded using MODE_INTRA or not (in which case the current CU is encoded using MODE_INTER).

For example, video decoder 300 may determine whether the current CU is a skip mode CU (662), e.g., by parsing the first bin. If the first bin is 1 (the "YES" path from block 662), the video decoder 300 may determine whether the current CU is encoded using MODE_IBC or not (664), e.g., by parsing the second bin. If the first bin is 1 and the second bin is 1 (the "YES" path from block 664), video decoder 300 may determine the current CU is encoded using MODE_IBC (666) and video decoder 300 may decode the current CU using MODE_IBC. If the first bin is 1 and the second bin is 0 (the "NO" path from block 664), video decoder 300 may determine the current CU is encoded using MODE_INTER (678) and decode the current CU using MODE_INTER. If the first bin is 0 (the "NO" path from block 662), video decoder 300 may determine whether the current CU is encoded using one of the SCC modes (668). If the first bin is 0 and the second bin is 1 (the "YES" path from block 668), video decoder 300 may determine whether the current CU is encoded using MODE_IBC or not (670), e.g., by parsing the third bin. If the first bin is 0, the second bin is 1, and the third bin is 1 (the "YES" path from block 670), video decoder 300 may determine the current CU is encoded using MODE_IBC (666) and video decoder 300 may decode the current CU using MODE_IBC. If the first bin is 0, the second bin is 1 and the third bin is 0 (the "NO" path from block 670), video decoder 300 may determine the current CU was encoded using MODE_PLT (672) and decode the current CU using MODE_PLT. If the first bin is 0 and the second bin is 0 (the "NO" path from block 668), video decoder 300 may determine whether the current CU is encoded using MODE_INTRA or not (674), e.g., by parsing the third bin. If the first bin is 0, the second bin is 0 and the third bin is 1 (the "YES" path from block 674), video decoder 300 may determine the current CU was encoded using MODE_INTRA (676) and video decoder 300 may decode the current CU using MODE_INTRA. If the first bin is 0, the second bin is 0 and the third bin is 0 (the "NO" path from block 674), video decoder 300 may determine the current CU is encoded using MODE_INTER (678) and video decoder 300 may decode the current CU using MODE_INTER.

The extension of this mode signaling variant to the cases when some modes are not enabled may be similar to the examples of FIGS. 10-15. Below is one example.

For example, based on the techniques of this disclosure according to this mode signaling variant when INTER mode is disabled, e.g., in I tiles/slices, for a block size equal to or smaller than 4×4, etc., video encoder 200 and video decoder 300 may use the mode signaling scheme 680 as shown in FIG. 20. In the example of FIG. 20, the first bin is signaled to indicate if the current CU is a skip mode CU. If current CU is a skip mode CU, the current CU is encoded using MODE_IBC. If the current CU is not a skip mode CU, the second bin is signaled to indicate whether the current CU is encoded using one of palette mode or intra block copy mode (e.g., SCC modes). If the condition is TRUE (e.g., the current CU is encoded using one of palette mode or intra block copy mode), the third bin is signaled to indicate if the current CU is encoded using MODE_IBC or not (in which case the current CU is encoded using MODE_PLT). Otherwise, the current CU is encoded using MODE_INTRA.

For example, video decoder 300 may determine whether the current CU is a skip mode CU (682), e.g., by parsing the first bin. If the first bin is 1 (the "YES" path from block 682), the video decoder 300 may determine the current CU is encoded using MODE_IBC (684) and video decoder 300 may decode the current CU using MODE_IBC. If the first bin is 0 (the "NO" path from block 682), video decoder 300 may determine whether the current CU is encoded using one of the SCC modes (686). If the first bin is 0 and the second bin is 1 (the "YES" path from block 686), video decoder 300 may determine whether the current CU is encoded using MODE_IBC or not (688), e.g., by parsing the third bin. If the first bin is 0, the second bin is 1, and the third bin is 1 (the "YES" path from block 688), video decoder 300 may determine the current CU is encoded using MODE_IBC (684) and video decoder 300 may decode the current CU using MODE_IBC. If the first bin is 0, the second bin is 1, and the third bin is 0 (the "NO" path from block 688), video decoder 300 may determine the current CU was encoded using MODE_PLT (690) and decode the current CU using MODE_PLT. If the first bin is 0 and the second bin is 0 (the "NO" path from block 686), video decoder 300 may determine the current CU was encoded using MODE_INTRA (676) and video decoder 300 may decode the current CU using MODE_INTRA.

Figure 21:
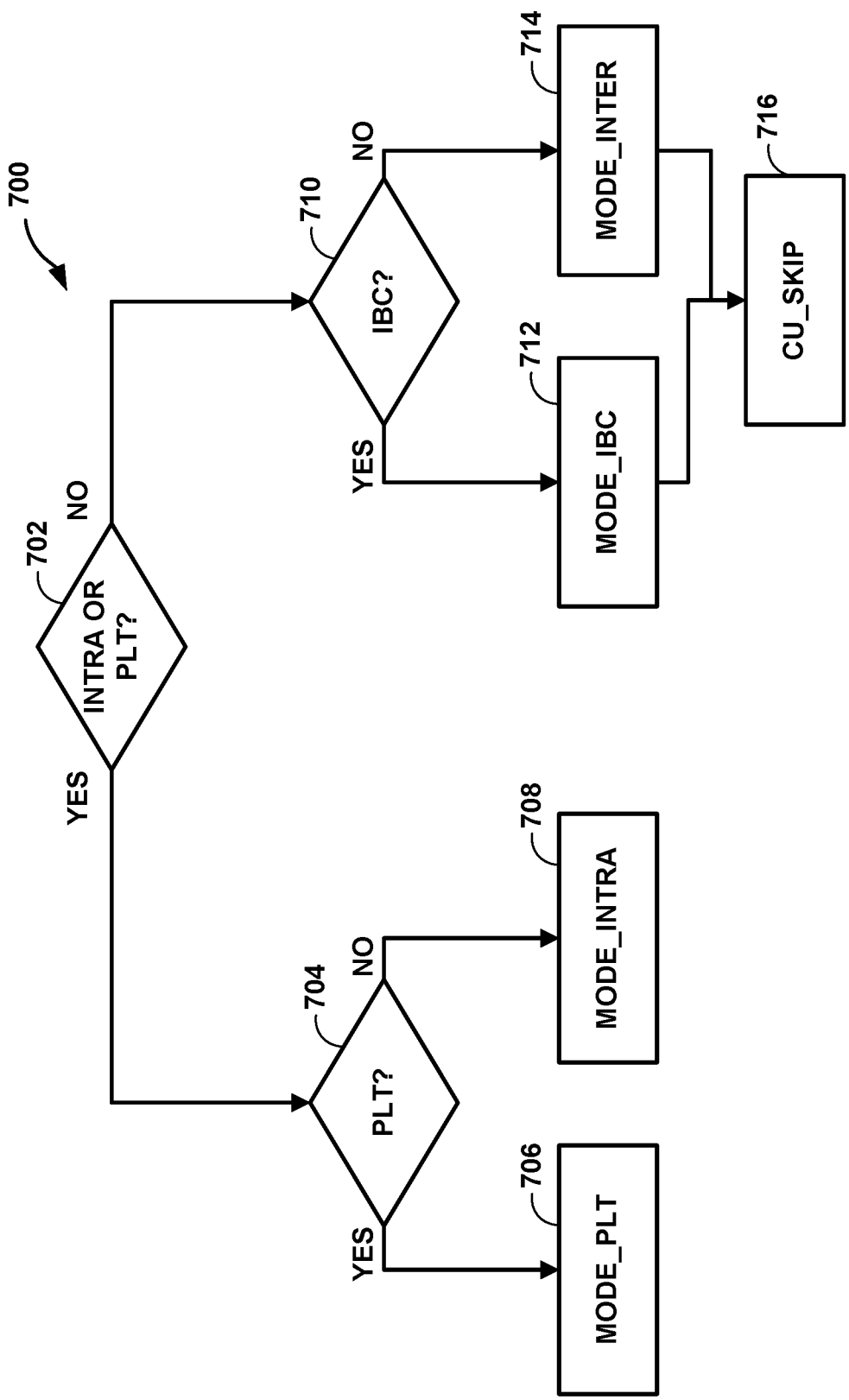
FIG. 21 is a diagram illustrating yet another example of a unified palette and prediction signaling method according to techniques of the present disclosure.

FIG. 21 is a diagram illustrating yet another example of a unified palette and prediction signaling according to techniques of the present disclosure. According to the techniques of this disclosure, in this example, yet another unified mode signaling variant 700 is disclosed to move the signaling of CU skip mode after the signaling of the prediction mode, e.g., MODE_INTRA and MODE_INTER and the signaling of the screen content mode, e.g., MODE_IBC and MODE_PLT. The techniques of this example may be combined with the techniques of the examples of FIGS. 9-20.

For example, when combining this example with the example of FIGS. 9-15, when all four modes are enabled, e.g., both palette mode and IBC mode are enabled in the SPS and for P or B tiles with a block size greater than 4×4, video encoder 200 and video decoder 300 may use the mode signaling 700 as depicted in FIG. 21. As with the earlier examples of this disclosure, video encoder 200 may determine a current mode of a current block of video data and signal the mode in a first, second and/or third bin, encode the current block of video data based on the current mode and include the bins in the encoded bitstream and video decoder 300 may read the signals in the bins to determine the current mode and decode the video data based on the indicated current mode.

In the example of FIG. 21, the first bin is signaled to indicate if the current CU is encoded using one of intra mode or palette mode. If the condition is TRUE (e.g., the current CU is encoded using one of intra mode or palette mode), the second bin is signaled to indicate if the current CU is encoded using MODE_PLT or not (in which case the current CU is encoded using MODE_INTRA). Otherwise, the second bin is signaled to indicate if the current CU is encoded using MODE_IBC or not (in which case the current CU is encoded using MODE_INTER), and the third bin is signaled to indicate if the current CU is a skip mode CU (CU_SKIP).

For example, video decoder 300 may determine whether the current CU is encoded using one of MODE_INTRA or MODE_PLT (702), e.g., by parsing the first bin. If the first bin is 1 (the "YES" path from block 702), the video decoder 300 may determine whether the current CU is encoded using MODE_PLT or not (704), e.g., by parsing the second bin. If the first bin is 1 and the second bin is 1 (the "YES" path from block 704), video decoder 300 may determine the current CU is encoded using MODE_PLT (706) and video decoder 300 may decode the current CU using MODE_PLT. If the first bin is 1 and the second bin is 0 (the "NO" path from block 704), video decoder 300 may determine the current CU is encoded using MODE_INTRA (708) and decode the current CU using MODE_INTRA. If the first bin is 0 (the "NO" path from block 702), video decoder 300 may determine whether the current CU is encoded using MODE_IBC (710).

If the first bin is 0 and the second bin is 1 (the "YES" path from block 710), video decoder 300 may determine whether the current CU is encoded using MODE_IBC (712) and decode the current CU using MODE_IBC). If the first bin is 0 and the second bin is 0, (the "NO" path from block 710), video decoder 300 may determine the current CU is encoded using MODE_INTER (714) and video decoder 300 may decode the current CU using MODE_INTER. If the first bin is 0 and the second bin is either 0 or 1, video decoder 300 may determine whether the current CU is a skip mode CU, e.g., by parsing a third bin (716). The extension of this mode signaling variant to the cases when some modes are not enabled may be similar to the examples of FIGS. 10-15.

Figure 22:
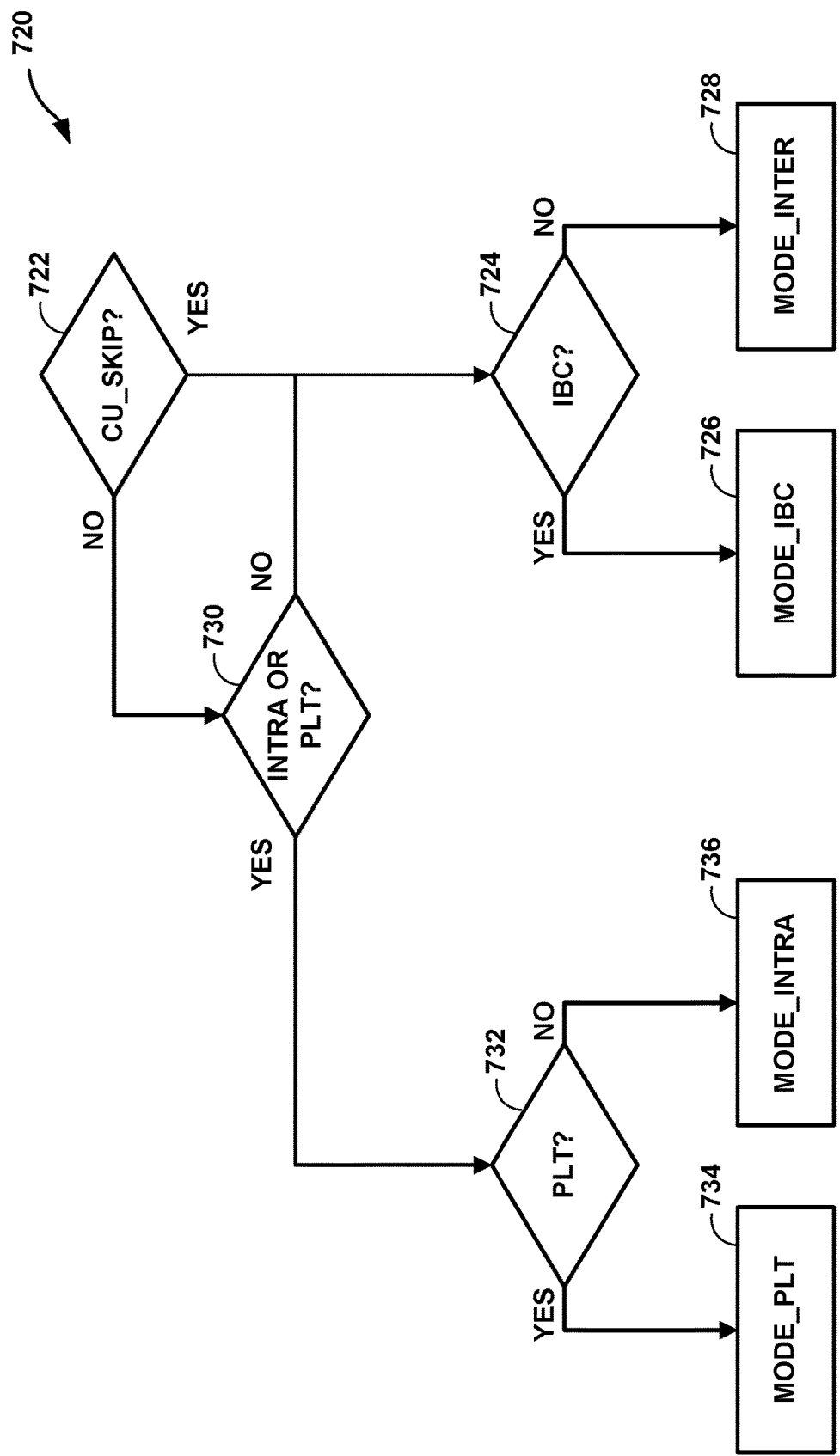
FIGS. 22-23 are diagrams illustrating yet another example of a unified palette and prediction signaling method according to techniques of the present disclosure.
Figure 23:
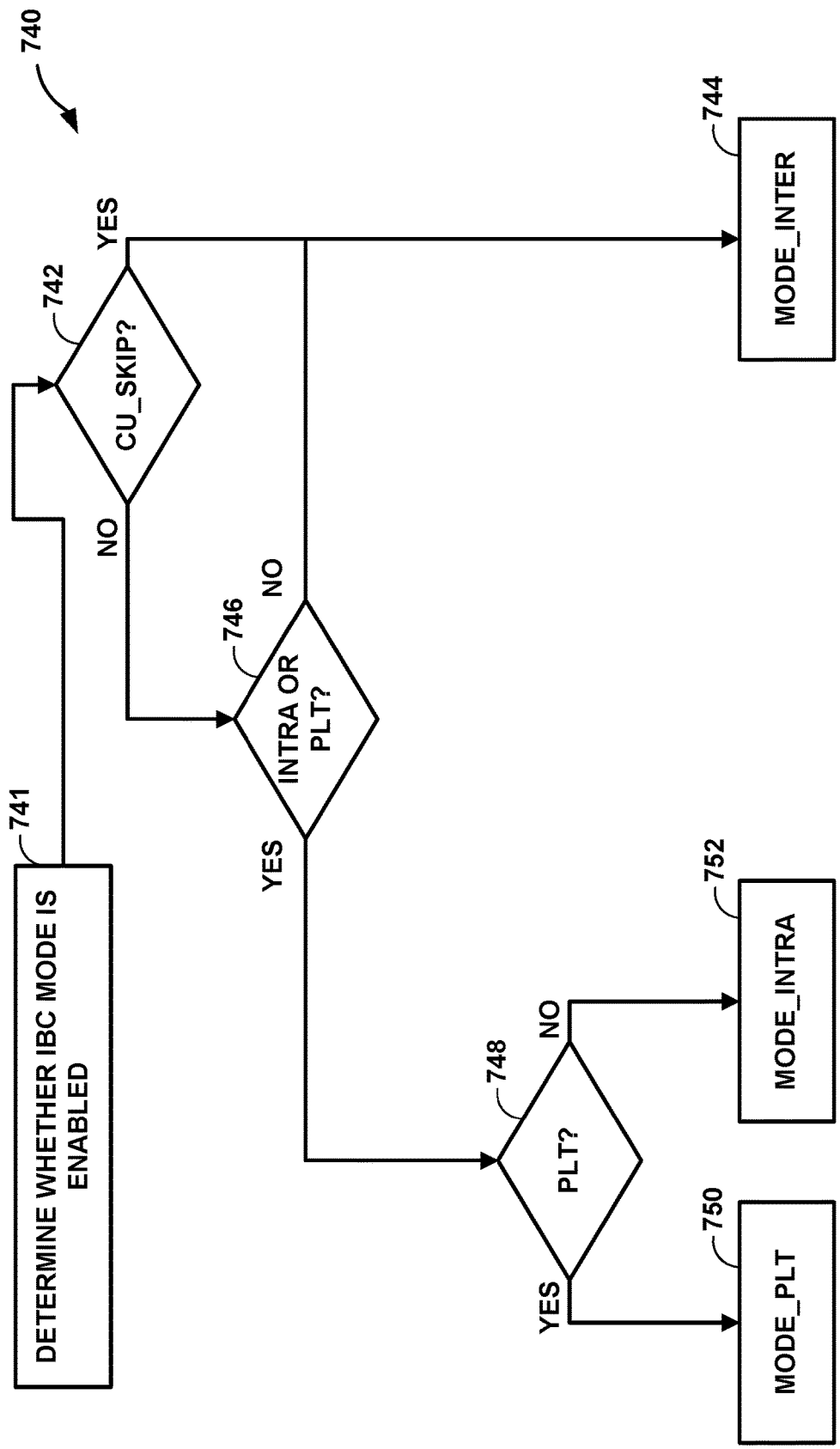

FIGS. 22-23 are diagrams illustrating yet another example of a unified palette and prediction signaling method according to techniques of the present disclosure. In another example, a mode signaling scheme is proposed to address the issue in JVET-N0258, for cases where IBC mode is enabled and where IBC mode is disabled. When all four modes are enabled, e.g., both palette mode and IBC mode are enabled in the SPS and for P or B tiles with block size greater than 4×4, video encoder 200 and video decoder 300 may use the mode signaling scheme as shown in FIG. 22. Video encoder 200 may determine a current mode of a current block of video data and signal the current mode in a first, second and/or third bin, encode the current block of video data based on the current mode and include the bins in the encoded bitstream and video decoder 300 may parse the signals in the bins to determine the current mode and decode the video data based on the indicated current mode.

In the example of FIG. 22, the first bin is signaled to indicate if the current CU is a skip mode CU. If current CU is a skip mode CU, the second bin is signaled to indicate if the current CU is encoded using IBC mode or not. If the current CU is a skip mode CU and was not encoded using IBC mode, the current CU is encoded using MODE_INTRA. If the current CU is not a skip mode CU, the second bin is signaled to indicate whether the current CU is encoded using one of intra mode or palette mode. If the condition is TRUE (e.g., the current CU is encoded using one of intra mode or palette mode), the third bin is signaled to indicate if the current CU is encoded using MODE_PLT or not (in which case the current CU is encoded using MODE_INTRA). Otherwise, the current CU is encoded using MODE_INTER.

For example, video decoder 300 may determine whether the current CU is a skip mode CU (722), e.g., by parsing the first bin. If the first bin is 1 (the "YES" path from block 722), the video decoder 300 may determine whether the current CU is encoded using MODE_IBC or not (724), e.g., by parsing the second bin. If the first bin is 1 and the second bin is 1 (the "YES" path from block 724), video decoder 300 may determine the current CU is encoded using MODE_IBC (726) and video decoder 300 may decode the current CU using MODE_IBC.

If the first bin is 1 and the second bin is 0 (the "NO" path from block 724), video decoder 300 may determine the current CU is encoded using MODE_INTER (728) and decode the current CU using MODE_INTER. If the first bin is 0 (the "NO" path from block 722), video decoder 300 may determine whether the current CU is encoded using one of intra mode or palette mode (730). If the first bin is 0 and the second bin is 1 (the "YES" path from block 730), video decoder 300 may determine whether the current CU is encoded using MODE_PLT or not (732), e.g., by parsing the third bin. If the first bin is 0, the second bin is 1, and the third bin is 1 (the "YES" path from block 732), video decoder 300 may determine the current CU is encoded using MODE_PLT (734) and video decoder 300 may decode the current CU using MODE_PLT.

If the first bin is 0, the second bin is 1 and the third bin is 0 (the "NO" path from block 732), video decoder 300 may determine the current CU was encoded using MODE_INTRA (736) and decode the current CU using MODE_INTRA. If the first bin is 0 and the second bin is 0 (the "NO" path from block 730), video decoder 300 may determine whether the current CU is encoded using MODE_IBC or not (724), e.g., by parsing the third bin. If the first bin is 0, the second bin is 0 and the third bin is 1 (the "YES" path from block 724), video decoder 300 may determine the current CU was encoded using MODE_IBC (726) and video decoder 300 may decode the current CU using MODE_IBC. If the first bin is 0, the second bin is 0 and the third bin is 0 (the "NO" path from block 724), video decoder 300 may determine the current CU is encoded using MODE_INTER (728) and video decoder 300 may decode the current CU using MODE_INTER.

When IBC is disabled, e.g., when IBC is disabled in the SPS, for example, for a chroma block when dual tree is used, etc., video encoder 200 and video decoder 300 may use the mode signaling scheme 740 as shown in FIG. 23. Video encoder 200 may determine a current mode of a current block of video data and signal the mode in a first, second and/or third bin, encode the current block of video data based on the current mode and include the bins in the encoded bitstream and video decoder 300 may parse the signals in the bins to determine the current mode and decode the video data based on the indicated current mode.

In the example of FIG. 23, the first bin is signaled with a syntax element, e.g., cu_skip_flag, to indicate if the current CU is a skip mode CU. If current CU is a skip mode CU, the current CU is encoded using MODE_INTER. If the current CU is not a skip mode CU, the second bin is signaled with a syntax element, e.g., pred_mode_flag, to indicate whether the current CU is encoded using one of intra mode or palette mode. If the condition is TRUE (e.g., the current CU is encoded using one of intra mode or palette mode), the third bin is signaled with a syntax element, e.g., pred_mode_plt_flag, to indicate if the current CU is encoded using MODE_PLT or not (in which case the current CU is encoded using MODE_INTRA). Otherwise, the current CU is encoded using MODE_INTER. This technique unifies the palette mode signaling (to be signaled in intra mode path) for both times where IBC mode is enabled (the example of FIG. 22) and where IBC mode is disabled (the example of FIG. 23).

For example, video decoder 300 may determine whether IBC mode is enabled for a current CU (741). For example, video decoder 300 may parse a syntax element in an SPS to determine that IBC is enabled or not enabled for CUs of the sequence to which the SPS applies or may determine that a size of the current CU is such that IBC mode is not enabled. Based on intra block copy mode not being enabled for the current CU, video decoder 300 may determine whether the current CU is a skip mode CU (742), e.g., by parsing the first bin. If the first bin is 1 (the "YES" path from block 742), the video decoder 300 may determine the current CU is encoded using MODE_INTER (468) and decode the current CU using MODE_INTER. If the first bin is 0 (the "NO" path from block 742), video decoder 300 may determine whether the current CU is encoded using one of intra mode or palette mode (746), e.g., by parsing a second bin. If the first bin is 0 and the second bin is 1 (the "YES" path from block 746), video decoder 300 may determine whether the current CU is encoded using MODE_PLT or not (748), e.g., by parsing the third bin. If the first bin is 0, the second bin is 1, and the third bin is 1 (the "YES" path from block 748), video decoder 300 may determine the current CU is encoded using MODE_PLT (750) and video decoder 300 may decode the current CU using MODE_PLT. If the first bin is 0, the second bin is 1 and the third bin is 0 (the "NO" path from block 748), video decoder 300 may determine the current CU was encoded using MODE_INTRA (752) and decode the current CU using MODE_INTRA.

Still with reference to FIG. 23, for example, video decoder 300 may determine whether IBC mode is enabled for a first CU (741). For example, video decoder 300 may parse a syntax element in an SPS to determine that IBC is enabled or not enabled for CUs of the sequence to which the SPS applies or may determine that a size of the first CU is such that IBC mode is not enabled. Based on intra block copy mode not being enabled for the first CU, may determine whether the first CU is a skip mode CU (742), e.g., by parsing a first bin. Based on the first CU not being a skip mode CU (the "NO" path from block 742), video decoder 300 may determine whether the first CU is encoded using one of an intra mode or a palette mode (746), e.g., by parsing a second bin. Based on the first CU being encoded using one of the intra mode or the palette mode (the "YES" path from block 746), video decoder 300 may determine whether the first CU is encoded using the palette mode (748), e.g., by parsing a third bin. Video decoder 300 may decode the first CU based on the determination of whether the first CU is encoded using the palette mode. Video decoder 300 may also determine whether IBC mode is enabled for a second CU. For example, video decoder 300 may parse a syntax element in an SPS to determine that IBC mode is enabled or not enabled for CUs of the sequence to which the SPS applies or may determine that a size of the second CU is such that IBC mode is not enabled. Based on IBC mode not being enabled for the second CU, video decoder 300 may determine whether a second CU is a skip mode CU (742), e.g., by parsing another first bin. Based on the second CU being a skip mode CU (the "YES" path from block 742), video decoder 300 may not parse a bin indicative of whether the second CU is encoded using intra block copy mode and decode the second CU using inter mode (744).

In some examples, video decoder 300 may determine video decoder 300 may determine whether IBC mode is enabled for a third CU (741). For example, video decoder 300 may parse a syntax element in an SPS to determine that IBC is enabled or not enabled for CUs of the sequence to which the SPS applies or may determine that a size of the third CU is such that IBC mode is not enabled. Based on intra block copy mode not being enabled for the third CU, video decoder 300 may determine whether the third CU is a skip mode CU (742), e.g., by parsing yet another first bin. Based on the third CU not being a skip mode CU (the "NO" path from block 742), video decoder 300 may determine whether the third CU is encoded using one of an intra mode or a palette mode (746), e.g., by parsing another second bin. Based on the third CU not being encoded using one of an intra mode or a palette mode (the "NO" path from block 746), video decoder 300 may decode the third CU using the inter mode (744).

When INTER mode is disabled, the same scheme as in the example of FIG. 5 may be applied.

In some examples, video decoder 300 may determine whether the current CU is a skip mode CU by determining a syntax element indicative of the skip mode, e.g., cu_skip_flag, in a first bin. In some examples, video decoder 300 may determine whether the current CU is encoded using one of the intra mode or the palette mode by determining a syntax element indicative of the intra mode, e.g., pred_mode_flag, in a second bin. In some examples, video decoder 300 may determine whether the current CU is encoded using palette mode by determining a syntax element indicative of the palette mode, e.g., pred_mode_plt_flag, in a third bin. For example, when pred_mode_plt_flag is 1, the current CU is encoded using palette mode and video decoder 300 may decode the current CU using palette mode. For example, when pred_mode_plt_flag is 0, the current CU is encoded using intra mode and video decoder 300 may decode the current CU using intra mode.

In some examples, the flag indicating if the current CU is encoded using MODE_INTRA or MODE_PLT in the examples of FIGS. 20-22 may be context coded. For example, video decoder 300 may determine whether the current CU is encoded using one of the intra mode or the palette mode by determining a context index, determining a context based on the context index, and determining a value for a syntax element based on the context. The value for the syntax element may be indicative of whether the first CU is encoded using one of the intra mode or the palette mode. The context modeling may be based on the prediction mode in the neighboring block(s), such as the CU above (cuAbove 452) and the CU on the left (cuLeft 454) of the current block 450 as shown in FIG. 8. Below are some examples.

The context index can be determined as follows:

ctxIdx=1if cuAbove is (MODE_INTRA or MODE_PLT) or cuLeft is (MODE_INTRA or MODE_PLT)

ctxIdx=0Otherwise

The context index can be determined as follows:

ctxIdx=2if cuAbove is (MODE_INTRA or MODE_PLT) and cuLeft is (MODE_INTRA or MODE_PLT)

Otherwise, ctxIdx=1if cuAbove is (MODE_INTRA or MODE_PLT) or cuLeft is (MODE_INTRA or MODE_PLT)

ctxIdx=0if neither cuAbove is (MODE_INTRA or MODE_*PLT*)*nor*cuLeft is (MODE_INTRA or MODE_*PLT*)

Figure 24:
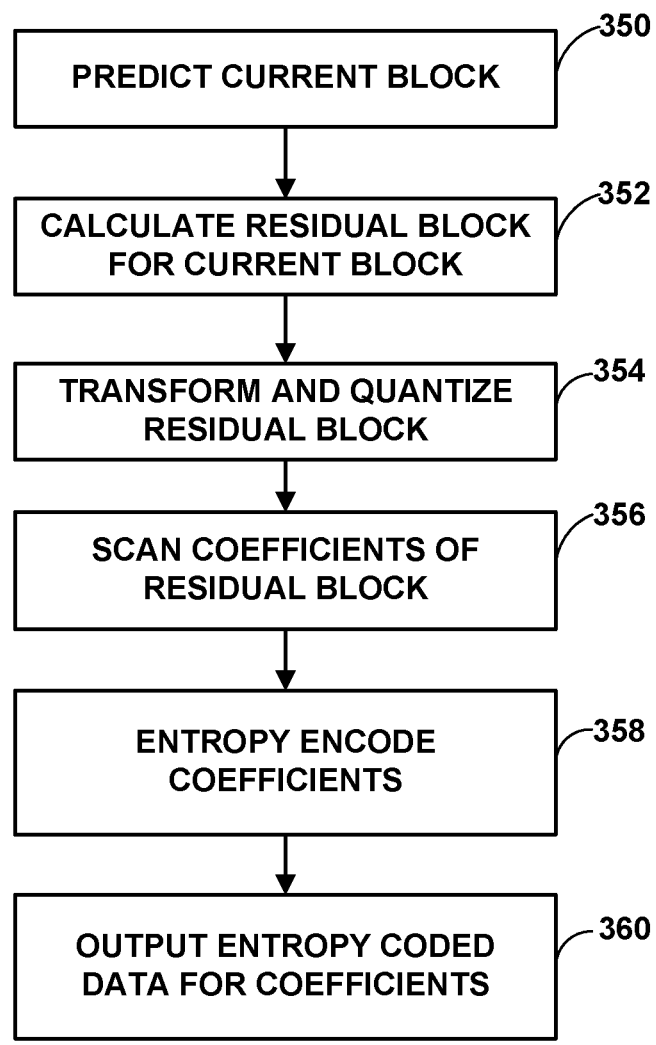
FIG. 24 is a flowchart illustrating an example operation of a video encoder.

FIG. 24 is a flowchart illustrating an example method for encoding a current block. The current block may comprise a current CU. Although described with respect to video encoder 200 (FIGS. 1 and 3), it should be understood that other devices may be configured to perform a method similar to that of FIG. 24.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 25:
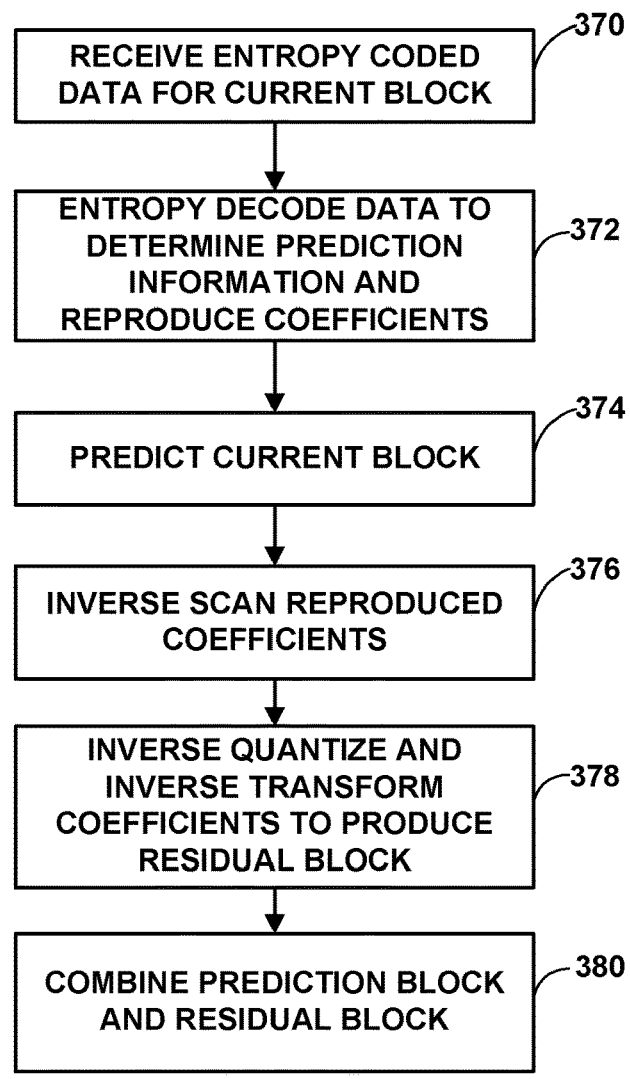
FIG. 25 is a flowchart illustrating an example operation of a video decoder.

FIG. 25 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 25.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

A unified signaling scheme is presented herein. According to the techniques of this disclosure, a video coder may determine signaling in a more consistent manner than in a non-unified signaling scheme. As such, fewer conditions may need to be checked by the video coder, for example the video decoder. Thus, the techniques of this disclosure may result in the video coder using less processing power and may reduce decoding latency.

This disclosure contains the following examples.

Example 1

A method of coding video data, the method comprising: coding a current mode of a current block of video data comprising: coding a first signal in a first bin, coding a second signal in a second bin, and coding a third signal in a third bin; and coding the current block of video data based upon the current mode, wherein the video data comprises I, B and P frames.

Example 2

The method of example 1, wherein the first signal identifies whether the current mode is a skip mode, if the first signal identifies the current mode as the skip mode the second signal indicates whether the current mode is an IBC mode and the third signal is not coded, if the first signal does not identify the current mode as the skip mode the second signal identifies whether or not the current mode is an intra or a palette mode, if the second signal identifies the current mode as the intra or the palette mode the third signal identifies whether the current mode is the palette mode, and if the second signal does not identify the current mode as the intra or the palette mode the third signal identifies whether the current mode is the IBC mode.

Example 3

The method of any combination of examples 1-2, wherein an inter mode is disabled, the first signal identifies whether the current mode is a skip mode, if the first signal identifies the current mode as the skip mode the second signal and third signal are not coded, if the first signal does not identify the current mode as the skip mode the second signal identifies whether or not the current mode is an intra or a palette mode, if the second signal identifies the current mode as the intra or the palette mode the third signal identifies whether the current mode is the palette mode, and if the second signal does not identify the current mode as the intra or the palette mode the third signal is not coded.

Example 4

The method of any combination of examples 1-3, wherein an IBC mode is disabled, the first signal identifies whether or not the current mode is a skip mode, if the first signal identifies the current mode as the skip mode the second and third signals are not coded, if the first signal does not identify the current mode as the skip mode the second signal identifies whether or not the current mode is an intra or a palette mode, if the second signal identifies the current mode as the intra or the palette mode the third signal identifies whether the current mode is the palette mode, if the second signal does not identify the current mode as the intra or the palette mode, the third signal is not coded.

Example 5

The method of any combination of examples 1-4, wherein a palette mode is disabled and the third signal is not coded, first signal identifies whether or not the current mode is a skip mode, if the first signal identifies the current mode as the skip mode the second signal identifies whether the current mode is an IBC mode, if the first signal does not identify the current mode as the skip mode, the second signal identifies either whether the current mode is an intra mode.

Example 6

The method of any combination of examples 1-5, wherein a palette mode and an IBC mode are disabled and the third signal is not coded, the first signal identifies whether or not the current mode is a skip mode, if the first signal identifies the current mode as the skip mode the second signal is not coded, if the first signal does not identify the current mode as the skip mode, the second signal identifies whether the current mode is an intra mode.

Example 7

The method of any combination of examples 1-6, wherein an inter mode and a palette mode are disabled and the third signal is not coded, the first signal identifies whether or not the current mode is a skip mode, if the first signal identifies the current mode as a skip mode the second signal is not coded, if the first signal does not identify the current mode as the skip mode, the second signal identifies whether the current mode is an intra mode.

Example 8

The method of any combination of examples 1-7, wherein an inter mode and an IBC mode are disabled and the second and third signal are not coded, and the first signal identifies whether the current mode is a palette mode.

Example 9

The method of example 1, wherein the first signal identifies whether the current mode is a skip mode, if the first signal identifies the current mode as the skip mode the second signal identifies whether or not the current mode is an IBC mode, and if the first signal does not identify the current mode as the skip mode the second signal identifies whether the current mode is an intra or the IBC mode, if the second signal identifies the current mode as the intra or the IBC mode the third signal identifies either whether the current mode is the IBC mode, if the second signal does not indicate whether the current mode is the intra or IBC mode the third signal indicates whether the current mode is a palette mode.

Example 10

The method of any combination of examples 1 and 9, wherein an inter mode is disabled, the first signal identifies whether or not the current mode is a skip mode, if the first signal identifies the current mode as the skip mode, the second signal and third signal are not coded, if the first signal does not identify the current mode as the skip mode, the second signal identifies whether the current mode is an intra or the IBC mode, if the second signal identifies the current mode as the intra or the IBC mode, the third signal identifies whether the current mode is the IBC mode, if the second signal does not identify the current mode as the intra or IBC mode, the third signal is not coded.

Example 11

The method of any combination of examples 1 and 9-10, wherein an IBC mode is disabled, the first signal identifies whether or not the current mode is a skip mode, if the first signal identifies the current mode as the skip mode, the second signal and third signal are not coded, if the first signal does not identify the current mode as the skip mode, the second signal identifies whether the current mode is an intra mode or the IBC mode, if the second signal identifies the current mode as the intra mode the third signal is not coded, if the second signal does not identify the current mode as the intra mode, the third signal identifies whether the current mode is a palette mode.

Example 12

The method of example 1, wherein the first signal identifies whether or not the current mode is a skip mode, if the first signal identifies the current mode as the skip mode, the second signal identifies whether or not the current mode is an IBC mode and the third signal is not coded, and if the first signal does not identify the current mode as the skip mode, the second signal identifies whether the current mode is a screen content coding mode, if the second signal identifies the current mode as the screen content coding mode, the third signal identifies whether the current mode is the IBC mode, if the second signal does not identify the current mode as the screen content coding mode, the third signal identifies whether the current mode is an intra mode.

Example 13

The method of any combination of examples 1 and 12, wherein an inter mode is disabled, and the first signal identifies whether or not the current mode is a skip mode, if the first signal identifies the current mode as the skip mode the second and third signals are not coded, if the first signal does not identify the current mode as the skip mode, the second signal identifies whether the current mode is a screen content coding mode, if the second signal identifies the current mode as the screen content coding mode the third signal identifies whether the current mode is the IBC mode, if the second signal does not identify the current mode as the screen content coding mode the third signal is not coded.

Example 14

The method of example 1, wherein the first signal identifies whether or not the current mode is an intra or palette mode, if the first signal identifies the current mode as an intra or a palette mode the second signal identifies whether the current mode is the palette mode and the third signal is not coded, if the first signal does not identify the current mode as the intra or the palette mode, the second signal identifies whether the current mode is an IBC mode and the third signal identifies whether the current mode is a skip mode.

Example 15

The method of example 1, wherein the first signal identifies whether or not the current mode is a skip mode, if the first signal identifies the current mode as the skip mode, the second signal identifies whether the current mode is an IBC mode, if the first signal does not identify the current mode as the skip mode, the second signal identifies whether the current mode is an intra or palette mode, if the second signal identifies the current mode as the intra mode or palette mode, the third signal identifies whether the current mode is the palette mode, if the second signal does not identify the current mode as the intra or palette mode, the third signal identifies whether the current mode is the IBC mode.

Example 16

The method of example 1, wherein the first signal identifies whether or not the current mode is a skip mode, if the first signal identifies the current mode as the skip mode, the second signal is not coded, if the first signal does not identify the current mode as the skip mode, the second signal identifies whether the current mode is an intra or palette mode, if the second signal identifies the current mode as the intra mode or palette mode, the third signal identifies whether the current mode is the palette mode, if the second signal does not identify the current mode as the intra or palette mode, the third signal is not coded.

Example 17

The method of any combination of examples 1-16, wherein a prediction mode indicating whether the current mode of the current block of video data is an intra mode or a palette mode is context coded.

Example 18

The method of example 17, wherein a context index (ctxIdx) is determined as ctxIdx=1 if a cuAbove is intra mode or a cuLeft is intra mode, and ctxIdx=0 otherwise.

Example 19

The method of example 17, wherein a context index (ctxIdx) is determined as ctxIdx=1 if a cuAbove is intra mode or palette mode or cuLeft is intra mode or palette mode, and ctxIdx=0 otherwise.

Example 20

The method of example 17, wherein a context index (ctxIdx) is determined as ctxIdx=2 if a cuAbove is intra mode or palette mode and cuLeft is intra mode or palette mode, ctxIdx=1 if cuAbove is intra mode or palette mode or cuLeft is intra mode or palette mode, and ctxIdx=0 if neither cuAbove is intra mode or palette mode nor cuLeft is intra mode or palette mode.

Example 21

The method of any combination of examples 1-20, wherein coding comprises decoding.

Example 22

The method of any combination of examples 1-20, wherein coding comprises encoding.

Example 23

A device for coding video data, the device comprising one or more means for performing the method of any of examples 1-20.

Example 24

The device of example 23, wherein the one or more means comprise one or more processors implemented in circuitry.

Example 25

The device of any of examples 23 or 24, further comprising a memory to store the video data.

Example 26

The device of any combination of examples 23-25, further comprising a display configured to display decoded video data.

Example 27

The device of any combination of examples 23-26, wherein the device comprises one or more of a camera, a computer, a mobile device, a broadcast receiver device, or a set-top box.

Example 28

The device of any of examples 23-27, wherein the device comprises a video decoder.

Example 29

The device of any of examples 23-28, wherein the device comprises a video encoder.

Example 30

A computer-readable storage medium having stored thereon instructions that, when executed, cause one or more processors to perform the method of any of examples 1-20.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   first determining whether intra block copy mode is enabled for a first coding unit (CU);
   based on intra block copy mode not being enabled for the first CU, determining whether the first CU is a skip mode CU;
   based on the first CU not being a skip mode CU, determining whether the first CU is encoded using one of an intra mode or a palette mode;
   based on the first CU being encoded using one of the intra mode or the palette mode, determining whether the first CU is encoded using the palette mode;
   decoding the first CU based on the determination of whether the first CU is encoded using the palette mode;
   first determining whether intra block copy mode is enabled for a second CU;
   based on intra block copy mode not being enabled for the second CU, determining whether the second CU is a skip mode CU; and
   based on the second CU being a skip mode CU, decoding the second CU using inter mode.

2. The method of claim 1, wherein determining whether the first CU is encoded using one of the intra mode or the palette mode comprises determining a value of a syntax element indicative of the intra mode.

3. The method of claim 2, wherein the syntax element is pred_mode_flag.

4. The method of claim 1, wherein determining whether the first CU is encoded using palette mode comprises determining a value of a syntax element indicative of the palette mode.

5. The method of claim 4, wherein the syntax element is pred_mode_plt_flag.

6. The method of claim 4, wherein the value of the syntax element is 1 and the first CU is decoded using the palette mode.

7. The method of claim 4, wherein the value of the syntax element is 0 and the first CU is decoded using the intra mode.

8. The method of claim 1, further comprising:
   first determining whether intra block copy mode is enabled for a third CU;
   based on intra block copy mode not being enabled for the third CU, determining whether the third CU is a skip mode CU;
   based on the third CU not being a skip mode CU, determining whether the third CU is encoded using one of an intra mode or a palette mode; and
   based on the third CU not being encoded using one of an intra mode or a palette mode, decoding the third CU using the inter mode.

9. The method of claim 1, wherein determining whether the first CU is encoded using one of the intra mode or the palette mode comprises:
   determining a context index;
   determining a context based on the context index; and
   determining a value for a syntax element based on the context,
   wherein the value for the syntax element is indicative of whether the first CU is encoded using one of the intra mode or the palette mode.

10. A device for decoding video data, the device comprising:
    a memory for storing the video data; and
    one or more processors implemented in circuitry and communicatively coupled to the memory, the one or more processors being configured to:
    first determine whether intra block copy mode is enabled for a first coding unit (CU);
    based on intra block copy mode not being enabled for the first CU, determine whether the first C is a skip mode CU;

based on the first CU not being a skip mode CU, determine whether the first CU is encoded using one of an intra mode or a palette mode;

based on the first CU being encoded using one of the intra mode or the palette mode, determine whether the first CU is encoded using the palette mode;

decode the first CU based on the determination of whether the first CU is encoded using the palette mode;

first determine whether intra block copy mode is enabled for a second CU;

based on intra block copy mode not being enabled for the second CU, determine whether the second CU is a skip mode CU; and based on the second CU being a skip mode CU, decode the second CU using inter mode.

11. The device of claim 10, wherein the one or more processors are configured to determine whether the first CU is encoded using one of the intra mode or the palette mode by determining the value a syntax element indicative of the intra mode.

12. The device of claim 11, wherein the syntax element is pred_mode_flag.

13. The device of claim 10, wherein the one or more processors are configured to determine whether the first CU is encoded using palette mode by determining a value of a syntax element indicative of the palette mode.

14. The device of claim 13, wherein the syntax element is pred_mode_plt_flag.

15. The device of claim 14, wherein the value of the syntax element is 1 and the first CU is decoded using the palette mode.

16. The device of claim 14, wherein the value of the syntax element is 0 and the first CU is decoded using the intra mode.

17. The device of claim 10, wherein the one or more processors are further configured to:

first determine whether intra block copy mode is enabled for a third CU;

based on intra block copy mode not being enabled for the third CU, determine whether the third CU is a skip mode CU;

based on the third CU not being a skip mode CU, determine whether the third CU is encoded using one of an intra mode or a palette mode; and based on the third CU not being encoded using one of an intra mode or a palette mode, decode the third CU using the inter mode.

18. The device of claim 10, wherein the one or more processors are configured to determine whether the first CU is encoded using one of the intra mode or the palette mode by:
  determining a context index;
  determining a context based on the context index; and
  determining a value for a syntax element based on the context,
  wherein the value for the syntax element is indicative of whether the first CU is encoded using one of the intra mode or the palette mode.

19. A non-transitory computer-readable storage medium having stored thereon instructions that, when executed, cause one or more processors to:

first determine whether intra block copy mode is enabled for a first coding unit (CU);

based on intra block copy mode not being enabled for the first CU, determine whether the first CU is a skip mode CU;

based on the first CU not being a skip mode CU, determine whether the first CU is encoded using one of an intra mode or a palette mode;

based on the first CU being encoded using one of the intra mode or the palette mode, determine whether the first CU is encoded using the palette mode;

decode the first CU based on the determination of whether the first CU is encoded using the palette mode;

first determine whether intra block copy mode is enabled for a second CU;

based on intra block copy mode not being enabled for the second CU, determine whether the second CU is a skip mode CU; and based on the second CU being a skip mode CU, decode the second CU using inter mode.

20. The non-transitory computer-readable storage medium of claim 19, wherein the instructions cause the one or more processors to determine whether the first CU is encoded using one of the intra mode or the palette mode by determining a value of a syntax element indicative of the intra mode.

21. The non-transitory computer-readable storage medium of claim 20, wherein the syntax element is pred_mode_flag.

22. The non-transitory computer-readable storage medium of claim 19, wherein the instructions cause the one or more processors to determine whether the first CU is encoded using palette mode by determining a value of a syntax element indicative of the palette mode.

23. The non-transitory computer-readable storage medium of claim 22, wherein the syntax element is pred_mode_plt_flag.

24. The non-transitory computer-readable storage medium of claim 22, wherein the value of the syntax element is 1 and the first CU is decoded using the palette mode.

25. The non-transitory computer-readable storage medium of claim 22, wherein the value of the syntax element is 0 and the first CU is decoded using the intra mode.

26. The non-transitory computer-readable storage medium of claim 19, wherein the instructions further cause the one or more processors to:

first determine whether intra block copy mode is enabled for a third CU;

based on intra block copy mode not being enabled for the third CU, determine whether the third CU is a skip mode CU;

based on the third CU not being a skip mode CU, determine whether the third CU is encoded using one of an intra mode or a palette mode; and based on the third CU not being encoded using one of an intra mode or a palette mode, decode the third CU using the inter mode.

27. The non-transitory computer-readable storage medium of claim 19, wherein the instructions cause the one or more processors to determine whether the first CU is encoded using one of the intra mode or the palette mode by:
  determining a context index;
  determining a context based on the context index; and
  determining a value for a syntax element based on the context,
  wherein the value for the syntax element is indicative of whether the first CU is encoded using one of the intra mode or the palette mode.

28. A device for decoding video data, the device comprising:
means for first determining whether intra block copy mode is enabled for a first coding unit (CU);
means for determining whether the first CU is a skip mode CU based on intra block copy mode not being enabled for the first CU;
means for determining whether the first CU is encoded using one of an intra mode or a palette mode based on the first CU not being a skip mode CU;
means for determining whether the first CU is encoded using the palette mode based on the first CU being encoded using one of the intra mode or the palette mode;
means for decoding the first CU based on the determination of whether the first CU is encoded using the palette mode;
means for first determining whether intra block copy mode is enabled for a second CU;
means for determining whether the second CU is a skip mode CU based on intra block copy mode not being enabled for the second CU; and
means for decoding the second CU using inter mode.

29. A method of encoding video data, the method comprising:
determining to disable intra block copy mode for a sequence of the video data;
determining a first coding mode for a first coding unit (CU) of the sequence of the video data;
based on the first coding mode being an intra mode or a palette mode, signaling a first bin with a first syntax element indicative of the first coding mode not being a skip mode;
after signaling the first bin, signaling a second bin with a second syntax element indicative of the first coding mode being one of the intra mode or the palette mode;
after signaling the second bin, signaling a third bin with a third syntax element indicative of whether the first coding mode is the palette mode;
encoding the first CU in accordance with the first coding mode;
determining a second coding mode for a second CU of the sequence of the video data;
based on the second coding mode being the skip mode, signaling a fourth bin with a fourth syntax element indicative of the second coding mode being the skip mode; and
encoding the second CU using inter mode.

30. The method of claim 29, wherein the second syntax element is pred_mode_flag.

31. The method of claim 29, wherein the third syntax element is pred_mode_plt_flag.

32. The method of claim 31, wherein the value of the third syntax element is 1 and the first coding mode is the palette mode.

33. The method of claim 31, wherein the value of the third syntax element is 0 and the first coding mode is the intra mode.

34. The method of claim 29, further comprising:
determining a third coding mode for a third CU of the sequence of the video data;
based on the third coding mode being an inter mode, signaling a fifth bin with a fifth syntax element indicative of the third coding mode not being the skip mode;
after signaling the fifth bin, signaling a sixth bin with a sixth syntax element indicative of the third coding mode not being one of an intra mode or a palette mode; and
encoding the third CU using the inter mode.

35. A device for encoding video data, the device comprising:
a memory for storing the video data; and
one or more processors implemented in circuitry and communicatively coupled to the memory, the one or more processors being configured to:
determine to disable intra block copy mode for a sequence of the video data;
determine a first coding mode for a first coding unit (CU) of the sequence of the video data;
based on the first coding mode being an intra mode or a palette mode, signal a first bin with a first syntax element indicative of the first coding mode not being a skip mode;
after signaling the first bin, signal a second bin with a second syntax element indicative of the first coding mode being one of the intra mode or the palette mode;
after signaling the second bin, signal a third bin with a third syntax element indicative of whether the first coding mode is the palette mode;
encode the first CU in accordance with the first coding mode;
determine a second coding mode for a second CU of the sequence of the video data;
based on the second coding mode being the skip mode, signal a fourth bin with a fourth syntax element indicative of the second coding mode being the skip mode; and
encode the second CU using inter mode.

36. The device of claim 35, wherein the second syntax element is pred_mode_flag.

37. The device of claim 35, wherein the third syntax element is pred_mode_plt_flag.

38. The device of claim 37, wherein the value of the third syntax element is 1 and the first coding mode is the palette mode.

39. The device of claim 37, wherein the value of the third syntax element is 0 and the first coding mode is the intra mode.

40. The device of claim 35, wherein the processing circuitry is further configured to:
determine a third coding mode for a third CU of the sequence of the video data;
based on the third coding mode being an inter mode, signal a fifth bin with a fifth syntax element indicative of the third coding mode not being the skip mode;
after signaling the fifth bin, signal a sixth bin with a sixth syntax element indicative of the third coding mode not being one of an intra mode or a palette mode; and
encode the third CU using the inter mode.

* * * * *